US010724596B2

(12) United States Patent
DeBruler et al.

(10) Patent No.: US 10,724,596 B2
(45) Date of Patent: Jul. 28, 2020

(54) SUPPORT AND CARRIER ASSEMBLIES AS WELL AS END MEMBER ASSEMBLIES AND GAS SPRING AND DAMPER ASSEMBLIES INCLUDING SAME

(71) Applicant: Firestone Industrial Products Company, LLC, Nashville, TN (US)

(72) Inventors: Brian S. DeBruler, Cottontown, TN (US); Brad W. Munchel, Avon, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 16/385,660

(22) Filed: Apr. 16, 2019

(65) Prior Publication Data

US 2019/0360550 A1  Nov. 28, 2019

Related U.S. Application Data

(63) Continuation of application No. 15/501,571, filed as application No. PCT/US2015/043578 on Aug. 4, 2015, now Pat. No. 10,260,590.

(Continued)

(51) Int. Cl.
*F16F 9/084* (2006.01)
*B60G 11/27* (2006.01)
(Continued)

(52) U.S. Cl.
CPC .............. *F16F 9/084* (2013.01); *B60G 11/27* (2013.01); *B60G 15/12* (2013.01); *F16F 9/0454* (2013.01); *F16F 9/0472* (2013.01);

*F16F 9/05* (2013.01); *F16F 9/057* (2013.01); *F16F 9/08* (2013.01); *F16F 9/3207* (2013.01);
(Continued)

(58) Field of Classification Search
CPC ........ F16F 9/084; F16F 9/0472; F16F 9/3214; F16F 9/36; B60G 15/12
See application file for complete search history.

(56) References Cited

U.S. PATENT DOCUMENTS 4,398,704 A * 8/1983 Buchanan, Jr. ........ B60G 11/28
267/64.21
6,332,624 B1 * 12/2001 Gilsdorf ............. B60G 17/0485
267/64.21

(Continued)

*Primary Examiner* — Vishal R Sahni
(74) *Attorney, Agent, or Firm* — Brian D. McAlhaney; Matthew P. Dugan

(57) ABSTRACT

Support and carrier assemblies are dimensioned for securement along a damper housing and dimensioned to operatively support an end member of a gas spring assembly on the damper housing as well as to form a substantially fluid-tight connected between the end member and the damper housing. The support and seal assembly can include a seal assembly with a seal carrier and at least one sealing element. The seal carrier can be dimensioned for securement along the damper housing. The at least one sealing element can be dimensioned sealingly engage the seal carrier and one of the end member and the damper housing to at least partially form the substantially fluid-tight connection therebetween. End member assemblies including such support and carrier assemblies are included. Gas spring and damper assemblies as well as suspension systems are also included.

20 Claims, 14 Drawing Sheets

Related U.S. Application Data

(60) Provisional application No. 62/032,928, filed on Aug. 4, 2014, provisional application No. 62/035,811, filed on Aug. 11, 2014.

(51) Int. Cl.
*F16F 9/04* (2006.01)
*F16F 9/05* (2006.01)
*F16F 9/08* (2006.01)
*F16F 9/32* (2006.01)
*B60G 15/12* (2006.01)
*F16F 9/36* (2006.01)

(52) U.S. Cl.
CPC .............. *F16F 9/3214* (2013.01); *F16F 9/36* (2013.01); *B60G 2202/32* (2013.01); *B60G 2206/40* (2013.01); *F16F 2232/08* (2013.01)

(56) References Cited

U.S. PATENT DOCUMENTS

| | | | |
|---|---|---|---|
| 10,260,590 B2* | 4/2019 | DeBruler | B60G 15/12 |
| 2002/0011697 A1* | 1/2002 | Pesch | B60G 15/063 |
| | | | 267/64.23 |
| 2007/0023981 A1* | 2/2007 | Helmling | B60G 15/14 |
| | | | 267/64.15 |
| 2010/0320657 A1* | 12/2010 | Chapman | F16F 9/0454 |
| | | | 267/140.13 |
| 2015/0273968 A1* | 10/2015 | Debruler | F16F 13/002 |
| | | | 267/64.24 |
| 2017/0219041 A1* | 8/2017 | Debruler | B60G 15/12 |

* cited by examiner

SUPPORT AND CARRIER ASSEMBLIES AS WELL AS END MEMBER ASSEMBLIES AND GAS SPRING AND DAMPER ASSEMBLIES INCLUDING SAME

This application is a Continuation Application of U.S. National Phase application Ser. No. 15/501,571, filed on Feb. 3, 2017, which claims the benefit of priority from International Application No. PCT/US2015/043578, filed on Aug. 4, 2015, which further claims the benefit of priority from U.S. Provisional Patent Application No. 62/032,928, filed on Aug. 4, 2014, and U.S. Provisional Patent Application No. 62/035,811, filed on Aug. 11, 2014, all of which are hereby incorporated herein by reference in their entirety.

BACKGROUND

The subject matter of the present disclosure broadly relates to the art of gas spring and damper devices and, more particularly, to support and carrier assemblies dimensioned for securement between components of gas spring and damper assemblies. End member assemblies including such support and carrier assemblies as well as gas spring and damper assemblies and suspension systems are also included.

The subject matter of the present disclosure may find particular application and use in conjunction with components for suspension systems of wheeled vehicles, and will be shown and described herein with reference thereto. It is to be appreciated, however, that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Gas spring and damper assemblies are well known and commonly used. Known gas spring and damper assemblies typically include a gas spring assembly and a damper (e.g., a hydraulic or fluid damper). The gas spring assembly can include opposing end members and a flexible bellows or sleeve secured therebetween to define a spring chamber suitable for containing a quantity of pressurized gas. The damper can include a damper housing and a damper piston located within the housing. A damper rod is connected to the damper piston and projects from the damper housing so that the damper piston and rod can undergo reciprocal motion relative to the damper housing.

In an assembled condition, the damper rod and damper housing extend into and through the gas spring assembly. Typically, the damper rod is connected to one of the end members of the gas spring assembly and the damper housing is connected to the other end member of the gas spring assembly. In many cases, one or more sealing elements can be operatively disposed between the damper housing and the other end member of the gas spring assembly, such as may be operative form a substantially fluid-tight seal therebetween.

Notwithstanding the common usage and overall success of conventional designs, it is believed desirable to develop gas spring and damper constructions that may provide improved performance, reduced weight, reduced costs of manufacture and/or assembly and/or such as may otherwise advance the art of gas spring and damper devices.

BRIEF DESCRIPTION

One example of a support and carrier assembly in accordance with the subject matter of the present disclosure can be dimensioned for securement along an associated damper housing and dimensioned to operatively support an associated end member of an associated gas spring assembly on the associated damper housing as well as to form a substantially fluid-tight connected between the associated end member and the associated damper housing. The support and seal assembly can include a seal assembly that can include a seal carrier and at least one sealing element. The seal carrier can be dimensioned for securement along the associated damper housing. The at least one sealing element can be dimensioned sealingly engagement between the seal carrier and one of the associated end member and the associated damper housing to at least partially form the substantially fluid-tight connection therebetween.

One example of a gas spring and damper assembly in accordance with the subject matter of the present disclosure can include a damper assembly having a longitudinally-extending axis, a gas spring assembly and a support and carrier assembly. The damper assembly can include a damper housing with a housing wall extending axially between opposing first and second ends. The housing wall can at least partially define a damping chamber that can contain a quantity of damping fluid. A damper rod assembly can include an elongated damper rod and a damper piston that can be secured along the elongated damper rod. The damper rod assembly can be operatively interengaged with the damper housing for reciprocal displacement relative thereto with the damper piston disposed within the damping chamber and at least a portion of the elongated damper rod projecting axially-outwardly from the first end of the damper housing. The gas spring assembly can be operatively connected with the damper assembly and can include a first end member that can be supported on the elongated damper rod in substantially fixed axial relation thereto. A second end member can be supported along the damper housing. A flexible spring member can be secured between the first and second end members in a substantially fluid-tight manner such that a spring chamber is at least partially defined by the flexible spring member between the first and second end member. A support and carrier assembly can be supported along the damper housing and can operatively support the second end member on the damper housing in at least one axial direction with the support and carrier assembly at least partially forming a substantially fluid-tight connected between the second end member and the damper housing.

One example of an end member in accordance with the subject matter of the present disclosure can be dimensioned for securement along an associated damper assembly and can be dimensioned for securement to an associated flexible spring member. The end member assembly can include an end member core having a longitudinal axis. The end member core can include a core wall extending peripherally about the longitudinal axis and longitudinally between opposing first and second ends. The core wall can include an inner surface that can at least partially define a longitudinal passage extending through the end member core and dimensioned to receive the associated damper assembly. A first mounting section can be disposed along the first end of the end member core. The first mounting section can be dimensioned to receive and retain an end of the associated flexible spring member. A second mounting section can be disposed along the second end of the end member core. The second mounting section can include a plurality of retaining members that can extend longitudinally along the core wall. The plurality of retaining members can have a first end attached to the core wall and a second end disposed in spaced relation to the core wall such that the plurality of retaining members are capable of undergoing resilient deflection to engage an associated securement feature on the associated damper assembly.

Another example of a gas spring and damper assembly in accordance with the subject matter of the present disclosure can include a damper assembly having a longitudinally-extending axis and a gas spring assembly. The damper assembly can include a damper housing including a housing wall extending axially between opposing first and second ends. The housing wall can at least partially define a damping chamber containing a quantity of damping fluid. A damper rod assembly can include an elongated damper rod and a damper piston secured along the elongated damper rod. The damper rod assembly can be operatively interengaged with the damper housing for reciprocal displacement relative thereto with the damper piston disposed within the damping chamber and at least a portion of the elongated damper rod projecting axially-outwardly from the first end of the damper housing. The gas spring assembly can include an end member supported on the elongated damper rod in substantially fixed axial relation thereto. An end member assembly according to the foregoing paragraph can be removably secured on the damper housing in substantially fixed axial relation thereto. A flexible spring member can be secured between the end member and the end member assembly to at least partially define a spring chamber.

One example of a suspension system in accordance with the subject matter of the present disclosure can include a pressurized gas system and at least one gas spring and damper assembly in accordance with any of the foregoing paragraphs. The spring chamber of the at least one gas spring and damper assembly can be disposed in fluid communication with the pressurized gas system such that pressurized gas can be transferred into and out of the spring chamber.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
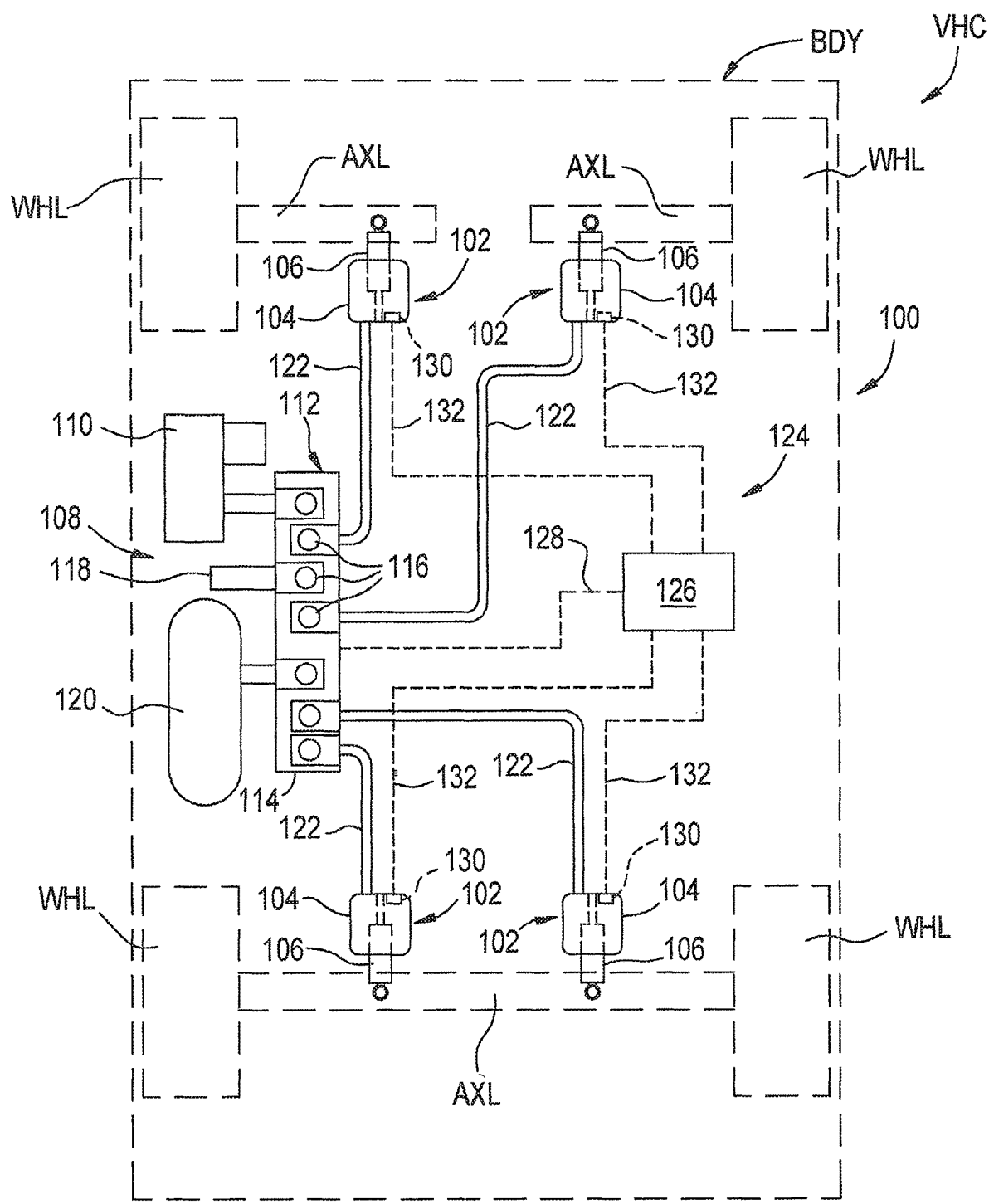
FIG. 1 is a schematic representation of one example of a suspension system of an associated vehicle including at least one gas spring and damper assembly in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner.

The suspension system can include any combination spring and damper devices operatively disposed between the sprung and unsprung masses of the associated vehicle. For example, a suspension system can include one or more gas spring and damper assemblies in accordance with the subject matter of the present disclosure. In many cases, two or more of such gas spring and damper assemblies in accordance with the subject matter of the present disclosure may be used. Additionally, in some cases, one or more spring (e.g., gas spring assemblies, coil spring assemblies, torsion bar assemblies) and one or more dampers (e.g., conventional shock absorbers or struts) can, optionally, be provided as separate components.

In the arrangement shown in FIG. 1, suspension system 100 includes four gas spring and damper assemblies 102, one of which is disposed toward each corner of the associated vehicle adjacent a corresponding wheel WHL. However, it will be appreciated that any other suitable number of gas spring and damper assemblies could alternately be used in any other configuration and/or arrangement, such as has been discussed above, for example. As shown in FIG. 1, gas spring and damper assemblies 102 are supported between axles AXL and body BDY of associated vehicle VHC, and include a gas spring (or gas spring assembly) 104 and a damper (or damper assembly) 106. It will be recognized that gas springs 104 are shown and described in connection with FIG. 1 as being of a rolling lobe-type construction. It is to be understood, however, that gas spring assemblies of other types, kinds and/or constructions could alternately be used without departing from the subject matter of the present disclosure.

Suspension system 100 also includes a pressurized gas system 108 operatively associated with the gas spring assemblies for selectively supplying pressurized gas (e.g., air) thereto and selectively transferring pressurized gas therefrom. In the exemplary embodiment shown in FIG. 1, pressurized gas system 108 includes a pressurized gas source, such as a compressor 110, for example, for generating pressurized air or other gases. A control device, such as a valve assembly 112, for example, is shown as being in communication with compressor 110 and can be of any suitable configuration or arrangement. In the exemplary embodiment shown, valve assembly 112 includes a valve block 114 with a plurality of valves 116 supported thereon. Valve assembly 112 can also, optionally, include a suitable exhaust, such as a muffler 118, for example, for venting pressurized gas from the system. Optionally, pressurized gas system 108 can also include a reservoir 120 in fluid communication with the compressor and/or valve assembly 112 and suitable for storing pressurized gas.

Valve assembly 112 is in communication with gas springs 104 of assemblies 102 through suitable gas transfer lines 122. As such, pressurized gas can be selectively transferred into and/or out of the gas springs through valve assembly 112 by selectively operating valves 116, such as to alter or maintain vehicle height at one or more corners of the vehicle, for example.

Suspension system 100 can also include a control system 124 that is capable of communication with any one or more systems and/or components (not shown) of vehicle VHC and/or suspension system 100, such as for selective operation and/or control thereof. Control system 124 can include a controller or electronic control unit (ECU) 126 communicatively coupled with compressor 110 and/or valve assembly 112, such as through a conductor or lead 128, for example, for selective operation and control thereof, which can include supplying and exhausting pressurized gas to and/or from gas spring and damper assemblies 102. Controller 126 can be of any suitable type, kind and/or configuration.

Control system 124 can also, optionally, include one or more height (or distance) sensing devices 130, such as, for example, may be operatively associated with the gas spring assemblies and capable of outputting or otherwise generating data, signals and/or other communications having a relation to a height of the gas spring assemblies or a distance between other components of the vehicle. Height sensing devices 130 can be in communication with ECU 126, which can receive the height or distance signals therefrom. The height sensing devices can be in communication with ECU 126 in any suitable manner, such as through conductors or leads 132, for example. Additionally, it will be appreciated that the height sensing devices can be of any suitable type, kind and/or construction, such as may operate using sound, pressure, light and/or electromagnetic waves, for example.

Having described an example of a suspension system (e.g., suspension system 100) that can include a gas spring and damper assembly in accordance with the subject matter of the present disclosure (e.g., gas spring and damper assembly 102), one example of such a gas spring and damper assembly dimensioned to include a support and carrier assembly in accordance with the subject matter of the present disclosure will now be described in connection with FIGS. 2-4. As shown therein, one example of a gas spring and damper assembly 200, such as may be suitable for use as a gas spring and damper assembly 102 in FIG. 1, for example, is shown as including a damper assembly 202 and a gas spring assembly 204 that is operatively connected with the damper assembly. It will be appreciated that, in use, gas spring and damper assembly 200 can undergo changes in length (i.e., can be displaced between extended and collapsed conditions) as a suspension system within which one or more assemblies are installed dynamically moves to accommodate forces and/or inputs acting on the vehicle.

Figure 2:
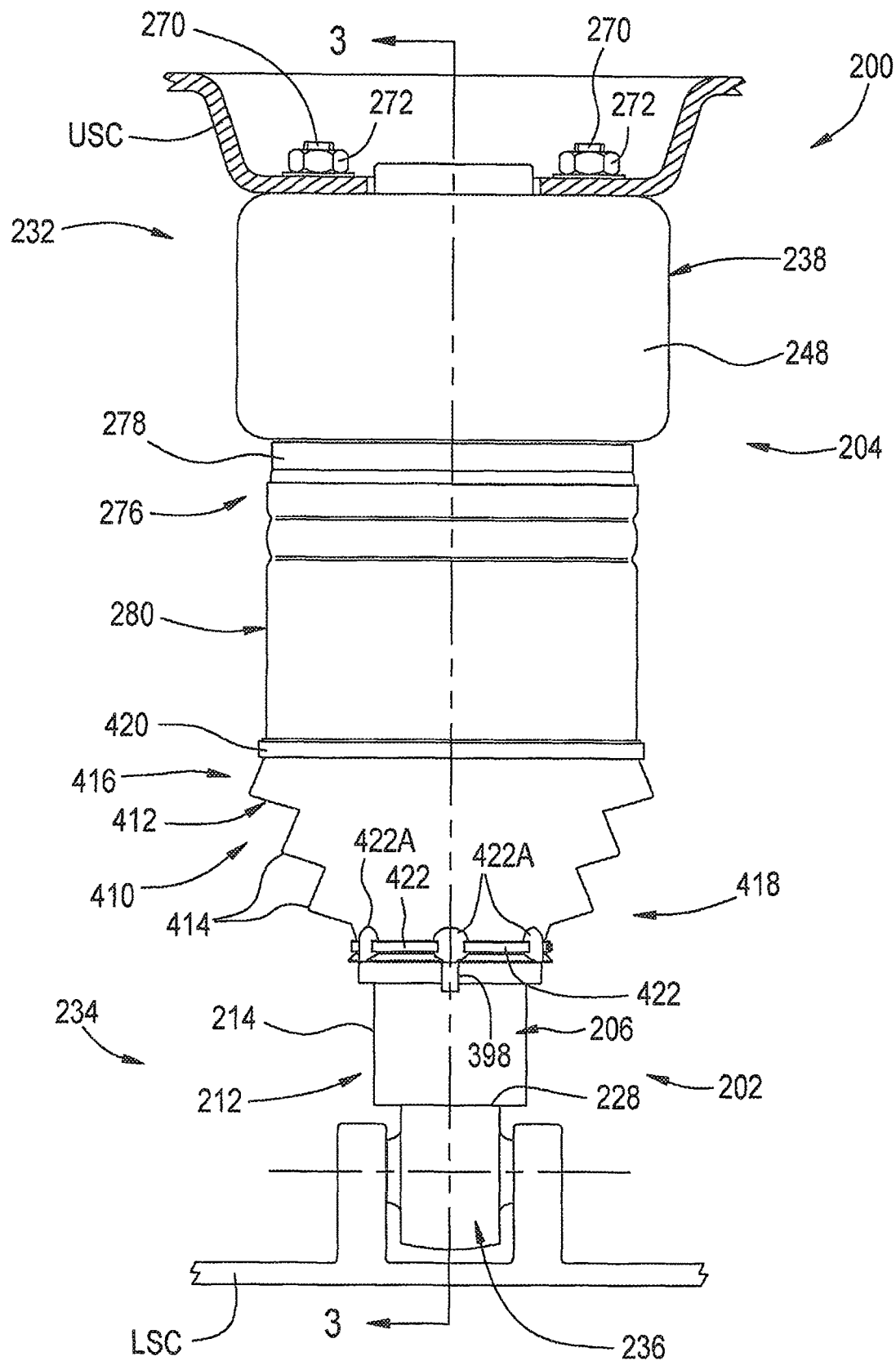
FIG. 2 is a side elevation view of one example of a gas spring and damper assembly in accordance with the subject matter of the present disclosure.
Figure 3:
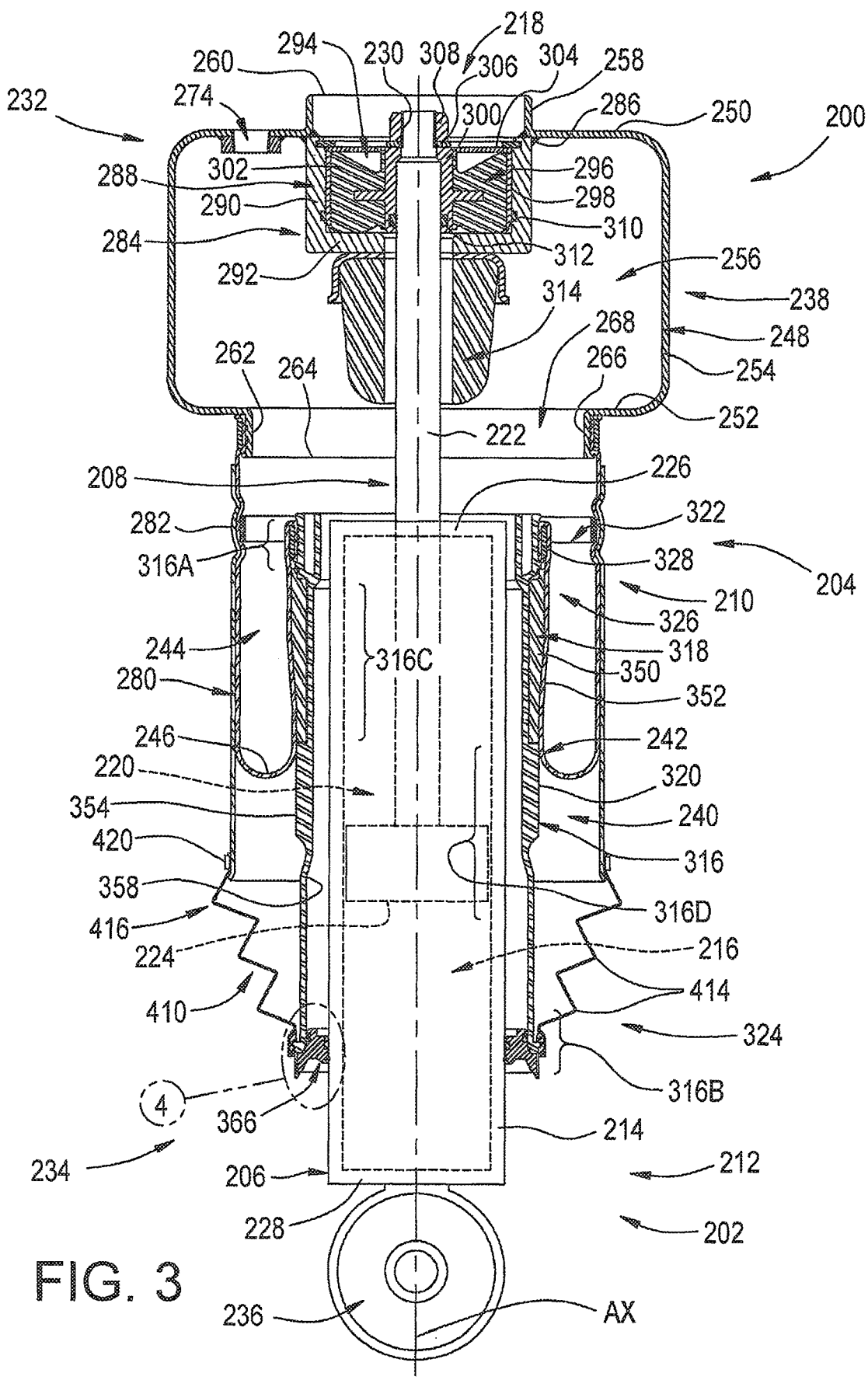
FIG. 3 is a cross-sectional side view of the gas spring and damper assembly in FIG. 2 taken from along line 3-3 therein.
Figure 4:
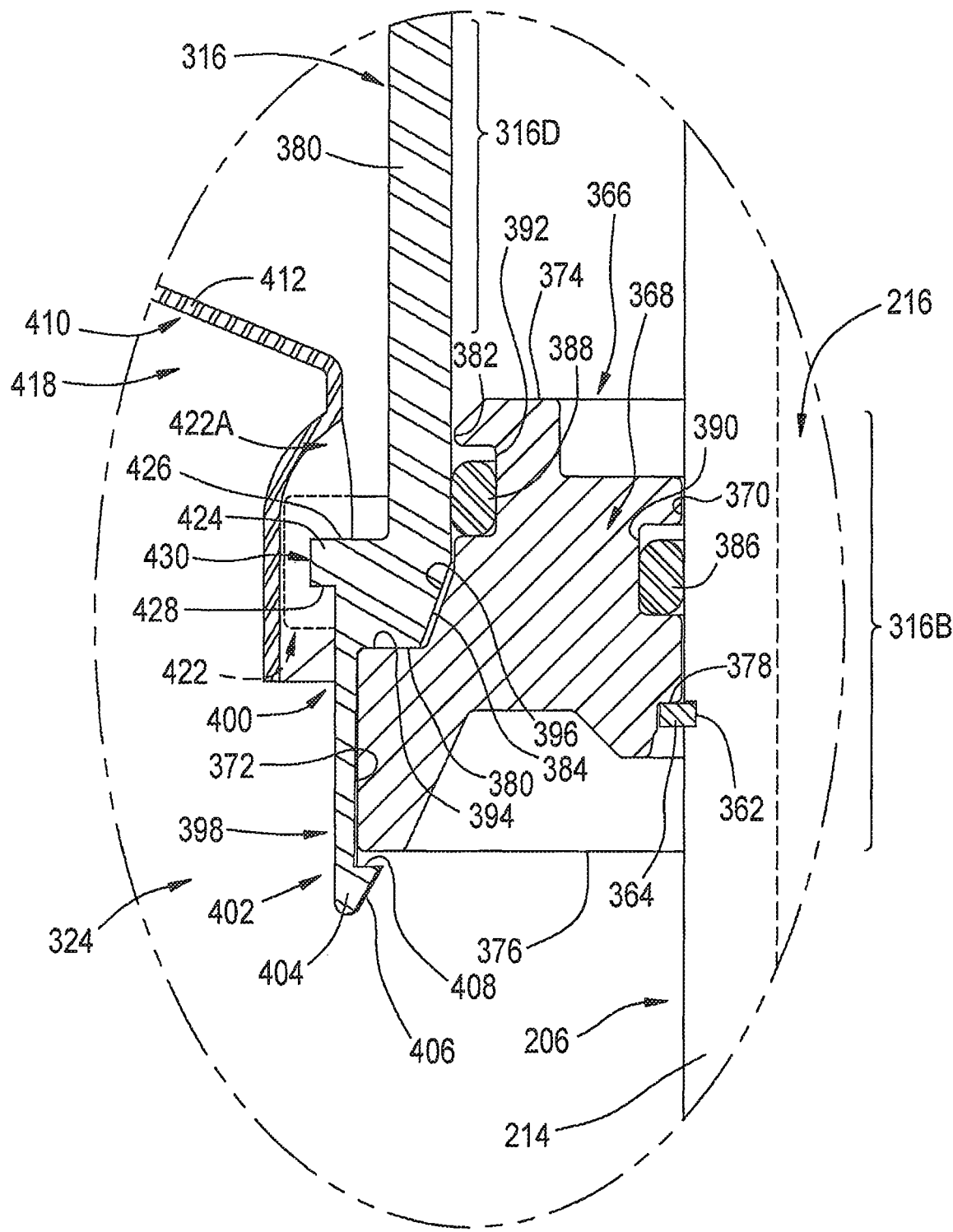
FIG. 4 is an enlarged cross-sectional view of the portion of the gas spring and damper assembly identified in Detail 4 of FIG. 3.
Figure 5:
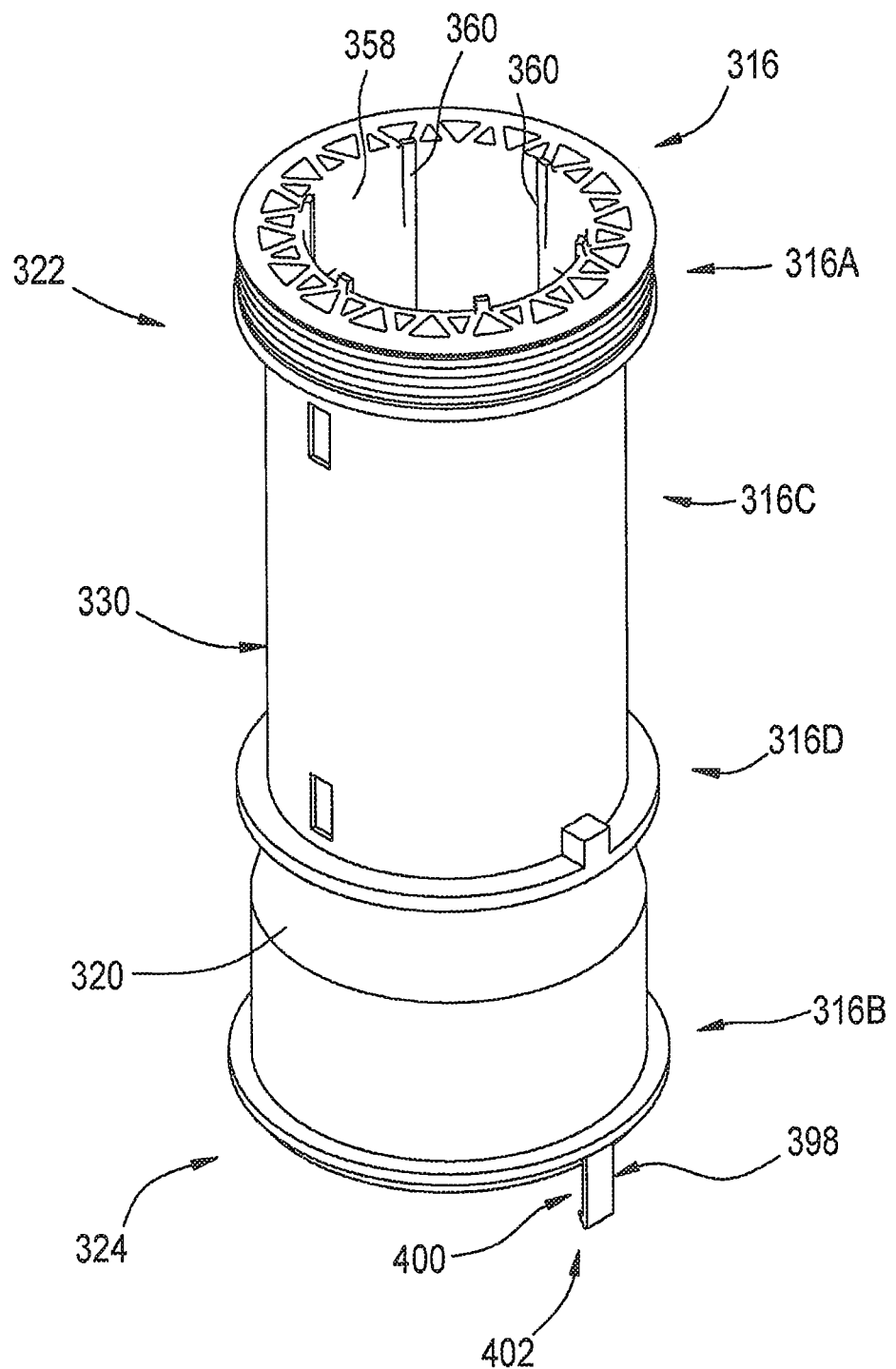
FIG. 5 is a top perspective view of the exemplary end member in FIGS. 2-4 prior to assembly on a damper housing.

Gas spring and damper assembly 200 is shown in FIGS. 2-4 as having a longitudinally-extending axis AX with damper assembly 202 and gas spring assembly 204 operatively secured to one another around and along axis AX. Damper assembly 202 is shown in FIGS. 2-4 as extending along axis AX and including a damper housing 206 and a damper rod assembly 208 that is at least partially received in the damper housing. As identified in FIG. 3, damper housing 206 extends axially between opposing housing ends 210 and 212, and includes a housing wall 214 that at least partially defines a damping chamber 216. Damper rod assembly 208 extends lengthwise between opposing ends 218 and 220 and includes an elongated damper rod 222 and a damper piston 224 disposed along end 220 of damper rod assembly 208. Damper piston 224 is received within damping chamber 216 of damper housing 206 for reciprocal movement along the housing wall in a conventional manner. A quantity of damping fluid (not shown) can be disposed within damping chamber and damper piston 224 can be displaced through the damping fluid to dissipate kinetic energy acting on gas spring and damper assembly 200. Though damper assembly 202 is shown and described herein as having a conventional construction in which a hydraulic fluid is contained within at least a portion of damping chamber 216, it will be recognized and appreciated that dampers of other types, kinds and/or constructions, such as pressurized gas or "air" dampers, for example, could be used without departing from the subject matter of the present disclosure.

Housing wall 214 can form an opening (not shown) along housing end 210. A damper end wall 226 can extend across the opening and can be secured on or along housing wall 214 such that a substantially fluid-tight connection is formed therebetween. Damper end wall 226 can include an opening (not identified) and elongated damper rod 222 can extend axially-outwardly from damping chamber 212 through the opening in a direction opposite housing end 212. Additionally, a damper end wall 228 can be connected across end 212 of damper housing 206 such that a substantially fluid-tight connection is formed therebetween.

Elongated rod 222 projects outwardly from damper end wall 226 such that end 218 of the elongated rod is outwardly exposed from the damper housing and is externally accessible with respect to the damper housing. A connection feature 230, such as a plurality of threads, for example, can be provided on or along the elongated rod for use in operatively connecting damper assembly 202 to an associated vehicle structure, a component of gas spring assembly 204 or another component of gas spring and damper assembly 200, such as is shown in FIGS. 2-4, for example.

It will be appreciated that gas spring and damper assembly 200 can be operatively connected between associated sprung and unsprung masses of an associated vehicle (or other construction) in any suitable manner. For example, one end of the assembly can be operatively connected to the associated sprung mass with the other end of the assembly disposed toward and operatively connected to the associated unsprung mass. As shown in FIG. 2, for example, a first or upper end 232 of assembly 200 can be secured on or along a first or upper structural component USC, such as associated vehicle body BDY in FIG. 1, for example, and can be secured thereon in any suitable manner. A second or lower end 234 of assembly 200 can be secured on or along a second or lower structural component LSC, such as associated vehicle body BDY in FIG. 1, for example, and can be secured thereon in any suitable manner. For example, end 212 of damper housing 206 of the damper assembly can be operatively connected to lower structural component LSC and can be secured thereto in any suitable manner. As one example, damper assembly 202 can include a connection feature 236, such as a pivot or bearing mount, for example, that is operatively disposed along damper housing 206 and is adapted for securement to lower structural component LSC in a suitable manner.

Gas spring assembly 204 includes an end member 238, such as a top cap, bead plate or reservoir enclosure, for example. Gas spring assembly 204 also includes an end member 240, such as a roll-off piston or piston assembly, for example, that is disposed in axially-spaced relation to end member 238. A flexible spring member, such as an elongated flexible wall or sleeve 242, for example, can be operatively connected between end members 238 and 240 in a substantially fluid-tight manner such that a spring chamber 244 is at least partially defined therebetween. In some cases, flexible sleeve 242 can form a rolling lobe 246 that is displaced along an outer surface of end member 240 as gas spring and damper assembly 200 moves between extended and compressed conditions.

As mentioned above, end member 238 can be of any suitable type, kind and/or construction, such as a top cap, bead plate or reservoir enclosure, for example. Additionally, it will be appreciated that end member 238 can be formed from any suitable material or combination of materials, and can include any suitable number or combination of one or more walls and/or wall portions. In the arrangement shown in FIGS. 2-4, for example, end member 238 can include an end member wall 248 that includes end wall portions 250 and 252 disposed in axially-spaced relation to one another and oriented transverse to axis AX. An outer side wall portion 254 can extend between end wall portions 250 and 252 such that the outer side wall portion and the end wall portions at least partially define a reservoir chamber 256 within end member 238. End member wall 248 can also include an inner side wall portion 258 that extends axially from along end wall portion 250 toward a distal edge 260. End member wall 248 can further include a mounting wall portion 262 that extends axially from along end wall portion 252 toward a distal edge 264. In a preferred arrangement, mounting wall portion 262 can include an inner surface 266 that at least partially defines an opening or passage 268 through which reservoir chamber 256 can fluidically communicate with spring chamber 244.

As discussed above, gas spring and damper assembly 200 can be operatively connected between associated sprung and unsprung masses of an associated vehicle (or other structure) in any suitable manner. As shown in FIG. 2, for example, first end 232 of assembly 200 can be secured on or along upper structural component USC in any suitable manner. As one example, one or more securement devices, such as mounting studs 270, for example, can be included along end member 238. In some cases, the one or more securement devices (e.g., mounting studs 270) can project outwardly from end member wall 248 and can be secured thereon in a suitable manner, such as, for example, by way of a flowed-material joint (not shown) or a press-fit connection (not identified). Additionally, such one or more securement devices can extend through mounting holes (not shown) in upper structural component USC and can receive one or more threaded nuts 272 or other securement devices, for example. Additionally, or as an alternative to the one or more of mounting studs, one or more threaded passages (e.g., blind passages and/or through passages) could be used in conjunction with a corresponding number of one or more threaded fasteners.

Gas spring assembly 204 can include a fluid communication port in fluid communication with spring chamber 244, such as may be used for transferring pressurized gas into and/or out of the gas spring assembly, for example. It will be appreciated that such a fluid communication port can be provided in any suitable manner. As one example, a fluid communication port could extend through one or more of the mounting studs. As another example, end member 238 can include a transfer passage 274 extending through end wall portion 250 of end member wall 248. Transfer passage 274 can be in fluid communication with reservoir chamber 256 and spring chamber 244 by way of passage 268. It will be appreciated, however, that any other suitable fluid communication arrangement could alternately be used. In some cases, transfer passage 274 can be adapted to receive a suitable connector fitting (not shown), such as may be suitable for operatively connecting gas transfer lines 122 (FIG. 1) to the gas spring and damper assembly.

An end 276 of flexible sleeve 242 can be secured on or along end member 238 in any suitable manner. As one example, a portion of the flexible wall can be disposed in abutting engagement along an outer surface (not numbered) of mounting wall portion 262 of end member wall 248 and secured thereto in any suitable manner, such as, for example, by way of a retaining ring 278 that can be crimped radially inwardly or otherwise deformed to form a substantially fluid-tight connection along the mounting wall portion. Additionally, gas spring and damper assembly 200 can, optionally, include an external sleeve or support, such as a restraining cylinder 280, for example, that can be secured on or along the flexible sleeve in any suitable manner. As one example, a portion of the flexible sleeve can be secured in abutting engagement along a wall portion of restraining cylinder 280 by way of a retaining ring 282 that can be crimped or otherwise deformed to form engagement between the restraining cylinder and the flexible sleeve. It will be appreciated, however, that other arrangements could alternately be used.

As mentioned above, end member 238 can include any suitable number or combination of one or more walls and/or wall portions. In the arrangement shown in FIGS. 2-4, for example, end member 238 includes a mounting cup 284 that can be supported on or along end member wall 248 in any suitable manner, such as by way of one or more flowed-material joints 286, for example. Mounting cup 284 can include a mounting cup wall 288 that can include a side wall portion 290 and an end wall portion 292 that together at least partially define a recess or cavity 294 within mounting cup 284.

Gas spring and damper assembly 200 can also include an elastomeric bushing assembly 296, which may be also referred to herein as a damper rod bushing, that can operatively connected between elongated rod 222 of damper assembly 202 and end member 238 of gas spring assembly 204 in any suitable manner. As such, forces acting on one of damper rod 222 and end member 238 that are experienced during use of the gas spring and damper assembly are transmitted or otherwise communicated through elastomeric bushing assembly 296 to the other of damper rod 222 and end member 238. Elastomeric bushing assembly 296 is shown in FIG. 3 as including an outer support element 298, which may sometimes be referred to in the art as an outer metal, and an inner support element 300, which may sometimes be referred to in the art as an inner metal. Elastomeric bushing assembly 296 also includes an elastomeric connector element 302 that is permanently attached (i.e., inseparable without damage, destruction or material alteration of at least one of the component parts) between outer and inner support elements 298 and 300. It will be appreciated that such a permanent attachment can be formed by way of one or more processes and/or can include the use of one or more treatments and/or materials. Non-limiting examples of suitable processes can include molding, adhering, curing and/or vulcanizing.

Elastomeric bushing assembly 296 can be operatively secured between damper rod 222 and end member 238 in any suitable manner. As one example, outer and inner support elements 298 and 300 can be formed from comparatively rigid materials with respect to the material of elastomeric connector element 302. An outside surface (not numbered) of outer support 298 can have an approximately cylindrical shape and can be dimensioned for receipt within recess 294 and to form a light press-fit with an inside surface (not numbered) of side wall portion 290. Additionally, outer support element 298 can be secured on or along end member 238, such as by way of a retaining ring 304 dimensioned to project radially outward from a groove (not numbered) formed along the inside surface side wall portion 290. An inside surface (not numbered) of inner support element 300 can be dimensioned to receive a portion of elongated rod 222 such that the inner support element and the elongated rod can be secured together in a suitable manner. As one example, inner support element 300 can be captured or otherwise secured on or along damper rod 222 by way of one or more securement features and/or components, such as a washer 306 and threaded nut 308, for example, engaging corresponding securement or connection features 230 on or along the damper rod. It will be appreciated, however, that other configurations and/or arrangements could alternately be used.

In some cases, a sealing element 310 can be operatively disposed between and form a substantially fluid-tight seal between end member 238 and outer support element 298. Additionally, or in the alternative, a sealing element 312 can be operatively disposed between and form a substantially fluid-tight seal between damper rod 222 and inner support element 300. It will be appreciated that sealing elements of any suitable type and/or kind can be used, such as O-rings, for example.

Gas spring and damper assembly 200 can include one or more additional components and/or features. For example, a jounce bumper 314 can be disposed within spring chamber 244 and/or reservoir chamber 256, and can be supported on or along one of end members 238 and 240 in a suitable manner. In the arrangement shown in FIG. 3, for example, jounce bumper 314 is received along elongated rod 222 and supported on end member 238. It will be appreciated, however, that other configurations and/or arrangements could alternately be used.

As mentioned above, end member 240 is of a type and kind commonly referred to as a roll-off piston or piston assembly. It will be appreciated that end member 240 can include any suitable number of one or more components and/or elements. For example, in the arrangement shown in FIG. 3, end member 240 includes an end member core 316 that is disposed along and supported on damper housing 206. An end member shell 318 is supported on the end member core and can include an outer surface 320 along which rolling lobe 246 can be displaced as gas spring and damper assembly 200 is displaced between compressed and extended conditions. In a preferred arrangement, end member core 316 can be configured to receive and support any one of a plurality of end member shells, such as may have any one of a wide variety of different sizes, shapes and/or configurations (e.g., outer profiles with different combinations of contours and/or shapes).

Additionally, it will be appreciated that end member 240 and the one or more components and/or elements thereof can be formed from any suitable material or combination of materials, and can include any suitable number or combination of one or more walls and/or wall portions. For example, end member core 316 and/or end member shell 318 can be formed from any suitable polymeric material or combination of polymeric materials. For example, end member core 316 and end member shell 318 can be formed from a substantially rigid polymeric material, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example.

With reference, now, to FIGS. 3-10, end member core 316 is shown as extending peripherally about axis AX and longitudinally between opposing ends 322 and 324. End member core 316 can include a first or upper mounting section 316A toward end 322 and on or along which an end 326 of flexible sleeve 242 can be operatively connected in any suitable manner. For example, a retaining ring 328 can be crimped radially-inward or otherwise deformed to form a substantially fluid-tight connection between end 326 of flexible sleeve 242 and mounting section 316A of end member core 316. In this manner, spring chamber 244 can be at least partially defined by flexible sleeve 242 between end members 238 and 240, such as has been described above.

End member core 316 can include a core wall 330 that extends peripherally about axis AX and longitudinally between ends 322 and 324. Core wall 330 can include a first or outer crimp wall 332 disposed along end 322 that terminates at a distal edge 334. In some cases, outer crimp wall 332 can at least partially define an outermost periphery along a longitudinal section of end member core 316, such as along mounting section 316A, for example. Outer crimp wall 332 can, optionally, include one or more engagement features (not identified) disposed along an outer surface 336 thereof that may be suitable for engaging a surface of flexible sleeve 242 to thereby enhance retention of the flexible wall and end member in an assembled condition. As one example, the one or more features disposed on or along the outer surface of outer crimp wall 332 can include a plurality of axially-spaced, endless, annular grooves (not identified). It will be appreciated, however, that other configurations and/or arrangements could alternately be used.

In some cases, outer crimp wall 332 can take the form of an endless annular wall that extends circumferentially about end member 240. Core wall 330 of end member 240 can also include a second or inner crimp wall 338 that is spaced radially-inward from outer crimp wall 332 such that radial gap GAP (FIG. 9) is formed therebetween. Inner crimp wall 338 can extend peripherally about axis AX, and can extend axially toward a distal edge 340 that can, in some cases, be disposed in alignment with distal edge 334 of outer crimp wall 332, such as is shown in FIGS. 3 and 5-10, for example. In such cases, the distal edge of inner crimp wall 338 can, optionally, be disposed in a common plane with distal edge 334 of outer crimp wall 332. Additionally, in a preferred arrangement, at least a portion of inner crimp wall 338 can be co-extensive (i.e., extending in axially-overlapping relation with one another) with outer crimp wall 332.

Figure 6:
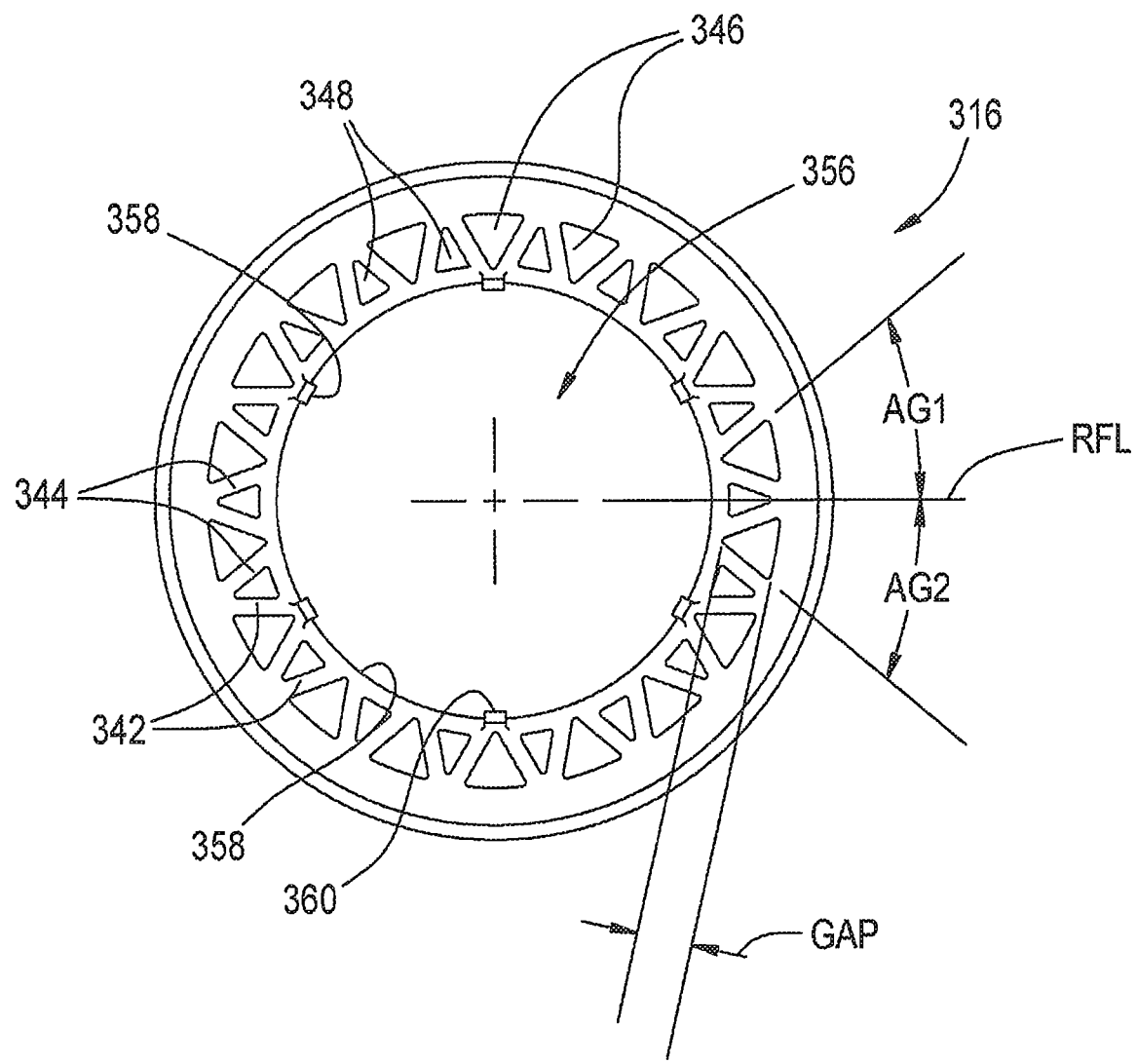
FIG. 6 is a top plan view of the exemplary end member in FIGS. 2-5.
Figure 7:
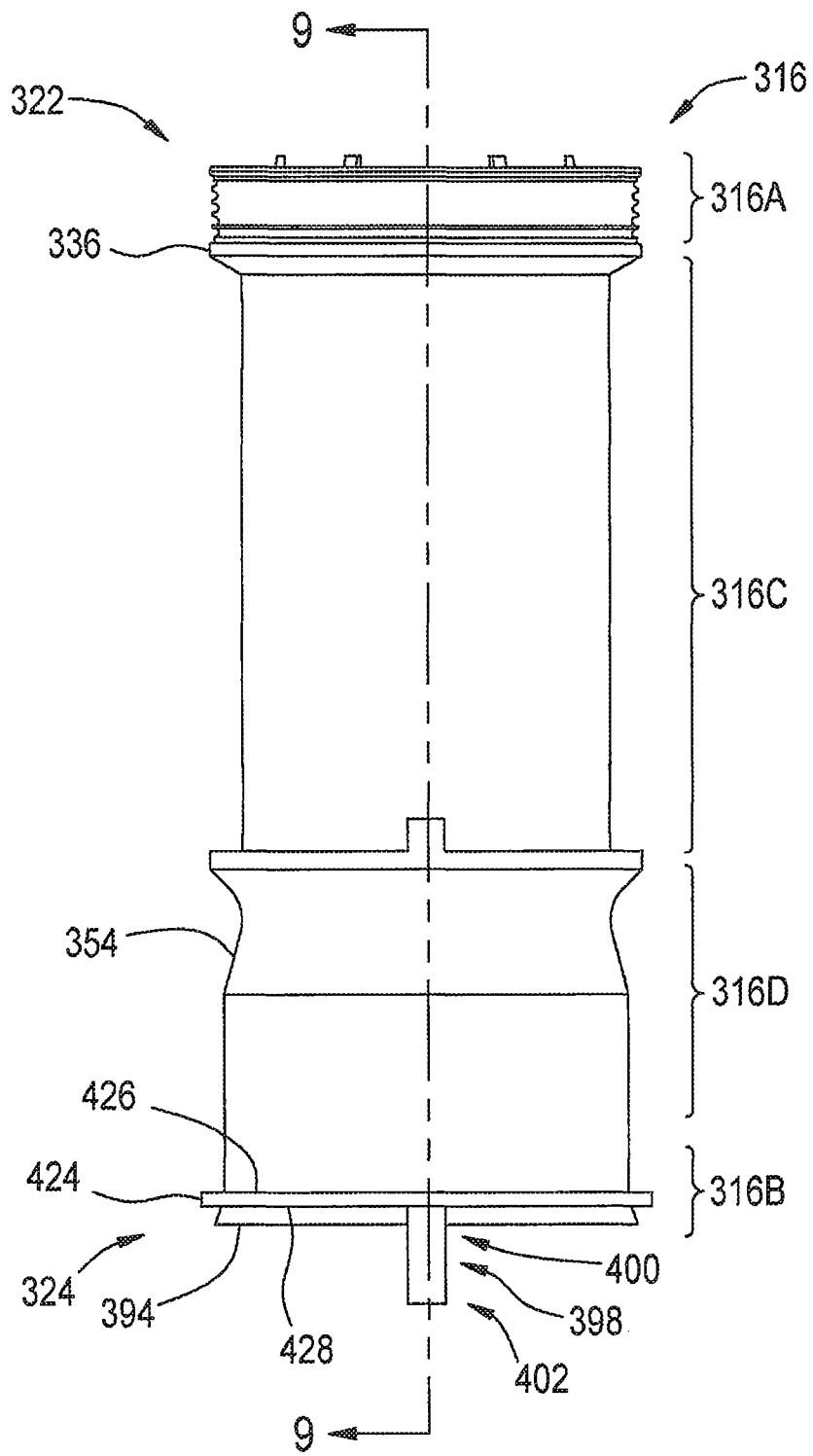
FIG. 7 is a side elevation view of the exemplary end member in FIGS. 2-6.
Figure 8:
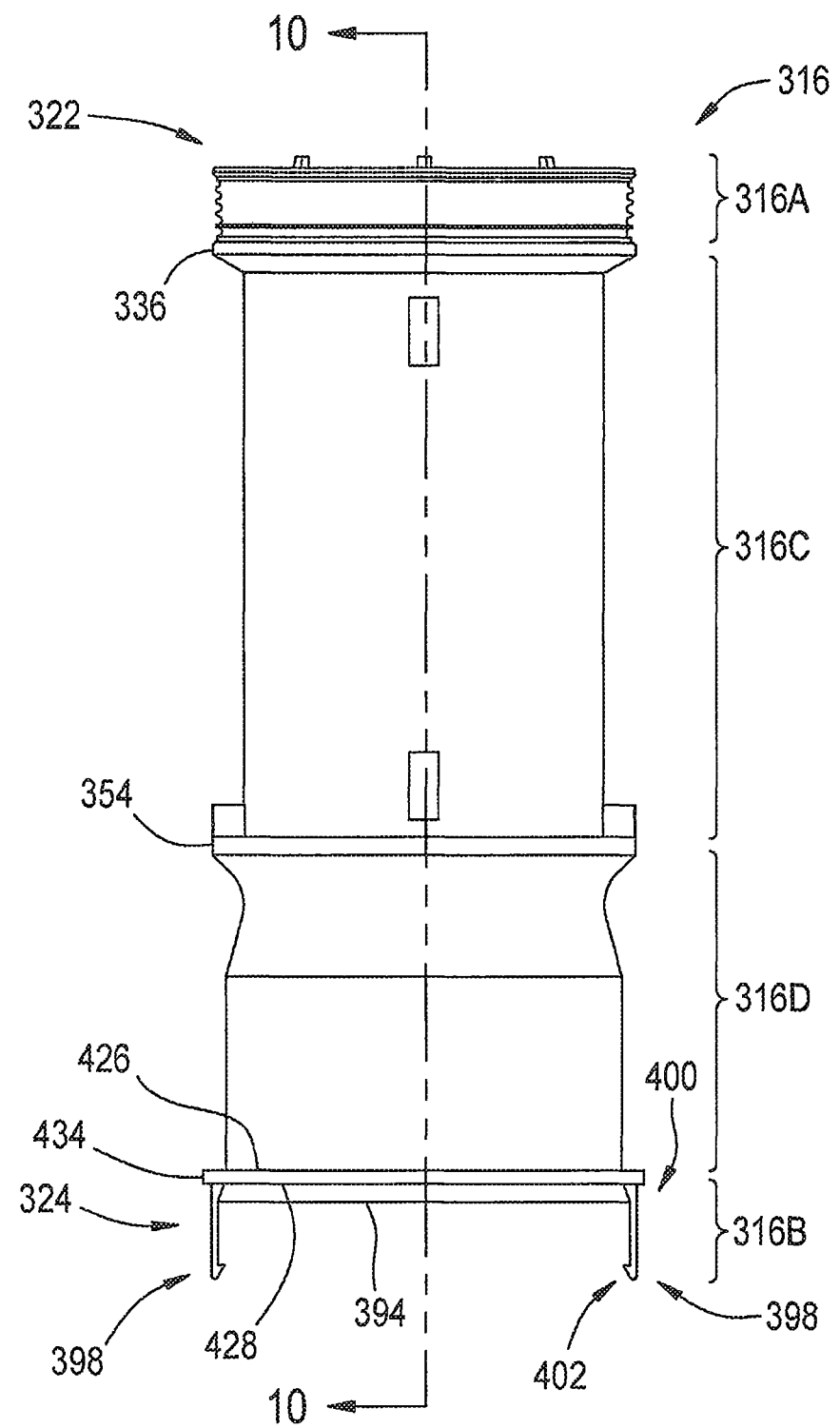
FIG. 8 is a side elevation view of the exemplary end member in FIGS. 2-7 shown perpendicular to the view in FIG. 7.
Figure 9:
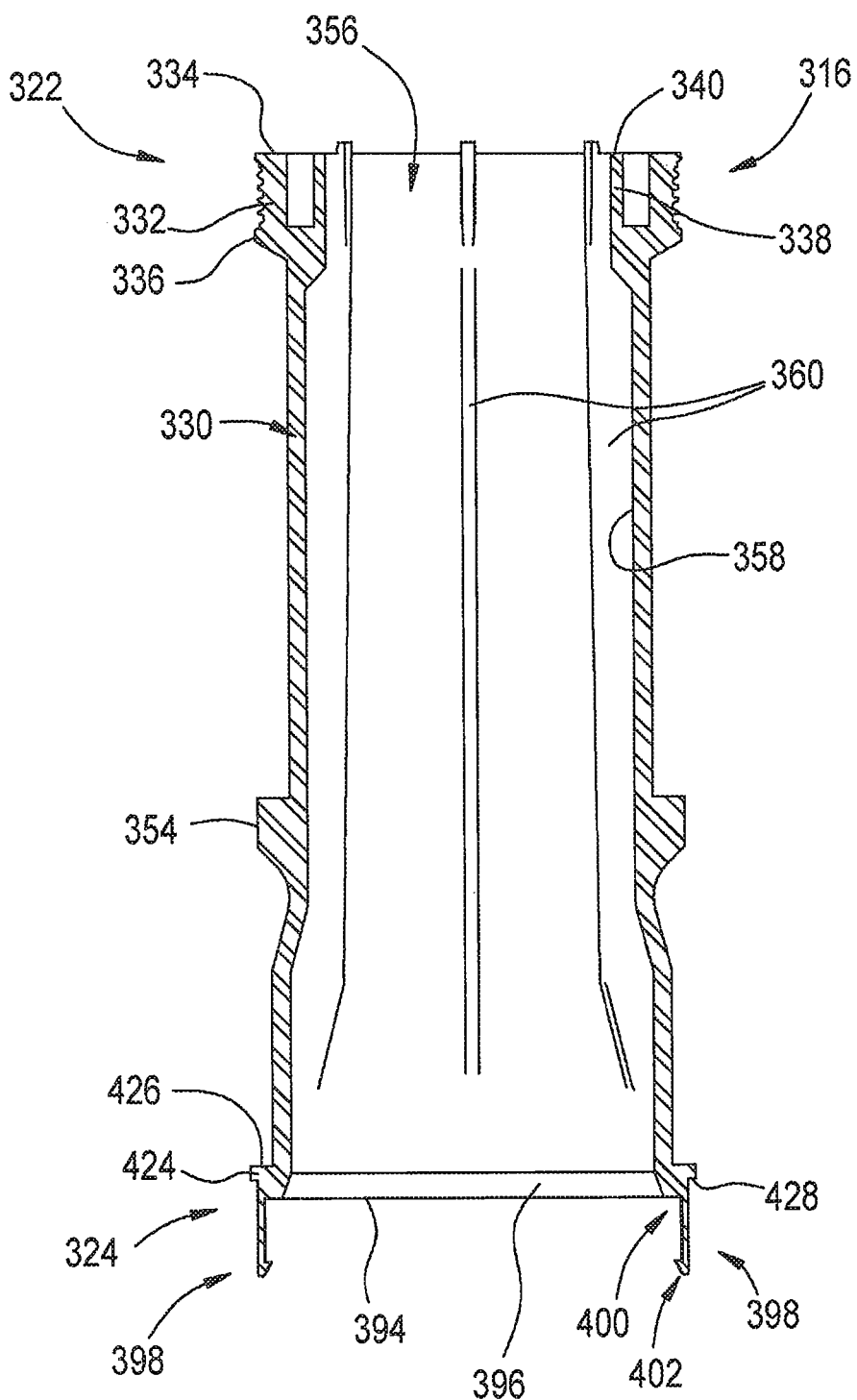
FIG. 9 is a cross-sectional side view of the exemplary end member in FIGS. 2-8 taken from along line 9-9 in FIG. 7.
Figure 10:
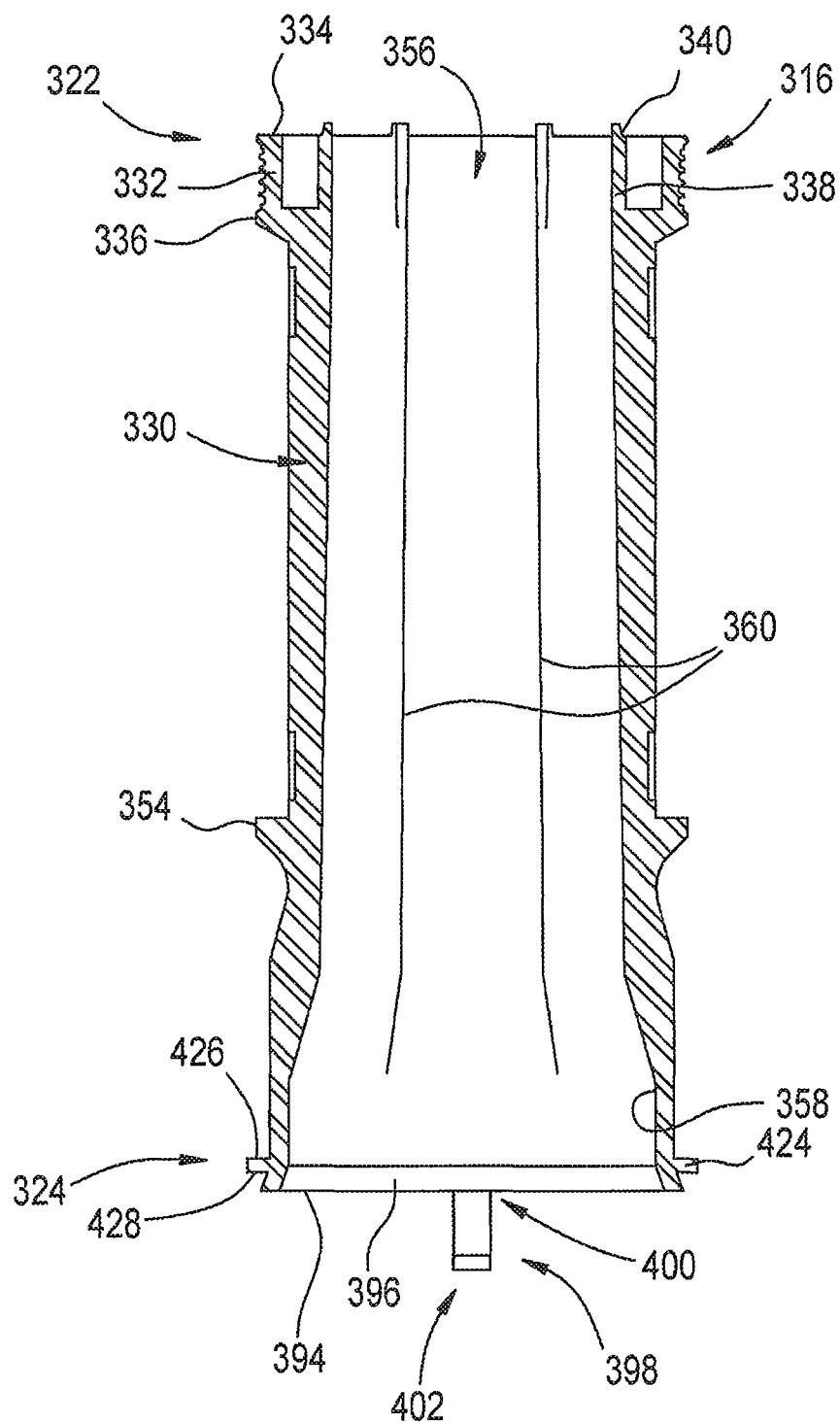
FIG. 10 is a cross-sectional side view of the exemplary end member in FIGS. 2-9 taken from along line 10-10 in FIG. 8.

Core wall 330 can also, optionally, include a plurality of connector walls that extend between and rigidly interconnect outer crimp wall 332 and inner crimp wall 338. It will be appreciated that the connector walls can take a variety of configurations and/or arrangements. As one example, end member core 316 is shown in FIGS. 3 and 5-10 as including a first plurality of connector walls 342 that are oriented in a first direction relative to the outer and inner crimp walls. End member core 316 can also include a second plurality of connector walls 344 that are oriented in a second direction relative to the outer and inner crimp walls. It will be recognized and appreciated that the orientation of connector walls 342 and 344 rotates about axis AX such that a substantially uniform angle relative to radial reference lines RFL (only one of which is shown in FIG. 6) is maintained for each connector wall. In some cases, connector walls 342 and 344 can be disposed at equal but opposite angles relative to any given reference line RFL, such as is represented in FIG. 6 by angular dimensions AG1 and AG2, for example. In this manner, connector walls 342 and 344 can extend between outer crimp wall 332 and inner crimp wall 338 to form a plurality of cavities having one of two different shapes and sizes, such as are identified as cavities 346 and 348, for example. Additionally, in the arrangement shown in FIGS. 5 and 6, adjacent ones of cavities 346 and 348 have alternating sizes and shapes with respect to one another.

As indicated above, outer crimp wall 332 is rigidly interconnected with inner crimp wall 338 by the plurality of connector walls (e.g., connector walls 342 and 344) and form a composite beam-like structure. As such, increased strength and rigidity of outer crimp wall 332 can be achieved without the use of metal backing rings to buttress the crimp wall during assembly operations and/or in an assembled condition.

Core wall 330 of end member core 316 can also include a second or intermediate section 316B that extends from along upper mounting section 316A in a direction toward end 324 of the end member core. Intermediate section 316B can include an outer surface dimensioned to receivingly engage end member shell 318, which can be secured therealong in any suitable manner. As one example, end member shell 318 can include a shell wall 350 that can be split or, alternately, formed into two or more shell wall sections (not shown) that can be assembled together around intermediate section 316B. It will be appreciated, however, that other configurations and/or arrangements could alternately be used. Additionally, in a preferred arrangement, shell wall 350 can include a contoured outer surface portion 352 that at least partially forms outer surface 320 of end member 240 along which rolling lobe 246 is displaced during use.

Core wall 330 of end member core 316 can also include a third or lower mounting section 316C disposed at or along end 324 that can be dimensioned or otherwise configured to at least partially support end member 240 in an axial direction on or along damper housing 206. In some cases, a fourth or transition section 316D can extend between and operatively interconnect intermediate section 316B and lower mounting section 316C. If provided, transition section 316D can include a contoured outer surface portion 354 that can be cooperative with contoured outer surface portion 352 such that a smooth and substantially continuous outer surface can be formed on or along end member 240. Core wall 330 can also include an inner surface 358 that can at least partially define a passage 356 through end member core 316. Core wall 330 can, optionally, include one or more elongated ribs 360 that can be disposed in peripherally-spaced relation to one another about axis AX and can extend longitudinally along inner surface 358. In a preferred arrangement, elongated ribs 360, if provided, can be dimensioned to form a sliding fit along the outer surface of damper housing 206 and thereby provide support to end member 240 on the damper housing in a radial direction.

An end member of a gas spring assembly (e.g., end member 240) can be supported and maintained in a longitudinal position on or along a damper housing of a damper assembly (e.g., damper housing 206) in any suitable manner to at least partially form a gas spring and damper assembly in accordance with the subject matter of the present disclosure. Additionally, a substantially fluid-tight seal can be formed in any suitable manner between such an end member and such a damper housing to at least partially form a gas spring and damper assembly in accordance with the subject matter of the present disclosure. In a preferred arrangement, a support and carrier assembly in accordance with the subject matter of the present disclosure can be operatively connected between such an end member and such a damper housing to both support and maintain the end member on the damper housing and to at least partially form a substantially fluid-tight seal therebetween.

It will be appreciated that such a support and carrier assembly can be supported on or along the damper housing in any suitable manner. For example, a support and carrier assembly can be disposed on or along damper housing 206 and operatively supported on housing wall 214 in a suitable manner. As one example, a section, portion and/or component of the support and carrier assembly could be fixedly attached to the damper wall, such as by way of a threaded connection or a flowed-material joint, for example. As another example, such as is shown in FIGS. 3 and 4, housing wall 214 can include a groove 362 extending radially inward into the housing wall from along the outer surface thereof. A retaining ring 364 can extend at least partially around damper housing 206 and can be at least partially disposed within groove 362. Retaining ring 364 can project radially outward beyond the outer surface of damper housing 206 and can provide an axial mounting or support surface for a support and carrier assembly in accordance with the subject matter of the present disclosure.

One example of a support and carrier assembly 366 in accordance with the subject matter of the present disclosure is shown in FIGS. 3 and 4. As discussed above, support and carrier assembly 366 can, in some cases, function as a support element to support or otherwise maintain an end member of a gas spring assembly in a longitudinal position (in at least one direction) on or along a damper housing of a damper assembly. It will be appreciated that support and carrier assembly 366 can be formed from any suitable material or combination of materials, and can include any suitable number or combination of one or more walls and/or wall portions.

For example, support and carrier assembly 366 can take the form of an endless, annular ring that extends peripherally about axis AX. Support and carrier assembly 366 can include a wall or body 368 that can include an inner surface 370 disposed adjacent the outer surface of damper housing 206 and an outer surface 372 disposed radially outward from inner surface 370. Body 368 can extend axially between end surfaces 374 and 376, and can include intermediate shoulder surfaces 378 and 380. In the arrangement shown, shoulder surface 378 extends radially outward from along inner surface 370 and faces toward end 324. In a preferred arrangement, shoulder surface 378 can be dimensioned to abuttingly engage retaining ring 364. Shoulder surface 380 can extend radially inward from along outer surface 372 and can face toward end 322 of end member core 316.

In some cases, body 368 can include one or more intermediate surfaces extending in an axial direction and disposed between inner and outer surfaces 370 and 372. For example, body 368 can include an intermediate surface 382 from along end surface 374 toward end surface 376. A tapered or frustoconical surface or wall portion 384 can extend between and operatively connect intermediate surface 382 and shoulder surface 380.

As discussed above, support and carrier assembly 366 can, in some cases, also function as a carrier for one or more sealing elements. In the arrangement shown in FIGS. 3 and 4, for example, a sealing element 386 is sealingly disposed between the outer surface of housing wall 214 and body 368. Additionally, a sealing element 388 is sealingly disposed between inner surface 358 of shell wall 352 and body 368. It will be appreciated that the one or more sealing elements (e.g., sealing elements 386 and/or 388) can be supported on or along body 368 in any suitable manner. For example, body 368 can include an endless, annular groove 390 extending radially outward into the body from along inner surface 370 that is dimensioned to receive and retain sealing element 386. As another example, body 368 can include an endless, annular groove 392 extending radially inward into the body from along outer surface 372 that is dimensioned to receive and retain sealing element 388. It will be appreciated, however, that other configurations and/or arrangements could alternately be used.

As indicated above, it will be appreciated that support and carrier assembly 366 and the components thereof can be formed from any suitable material or combination of materials. As one example, body 368 can be at least partially formed from a metal material (e.g., steel or aluminum) and/or a substantially-rigid polymeric material (e.g., a high-strength thermoplastic). Additionally, sealing elements 386 and 388 can be at least partially formed from an elastomeric material (e.g., natural rubber, synthetic rubber and/or thermoplastic elastomer).

Figure 11:
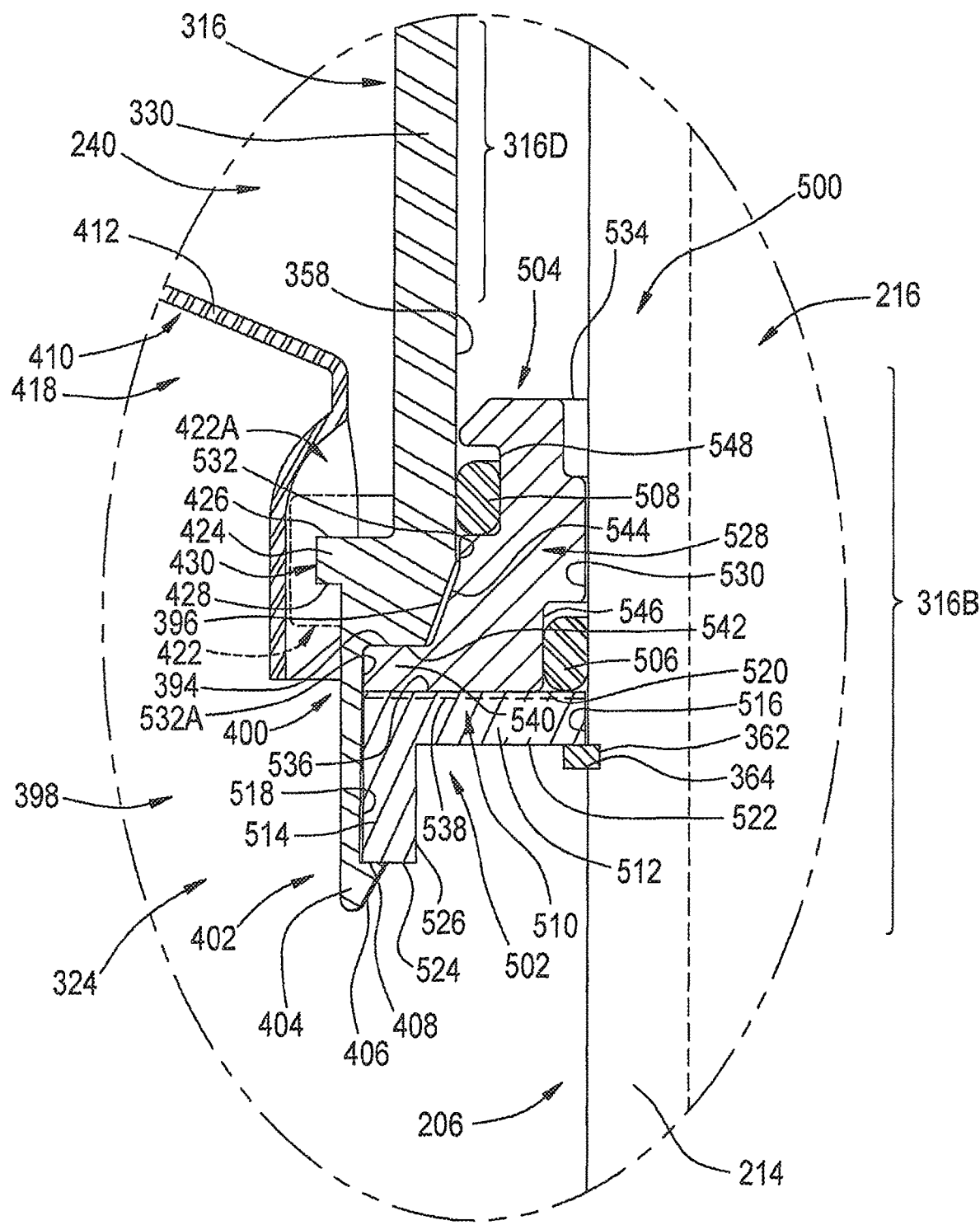
FIG. 11 is an enlarged cross-sectional view of an alternate embodiment of the portion of the gas spring and damper assembly identified in Detail 4 of FIG. 3.

Another example of a support and carrier assembly 500 in accordance with the subject matter of the present disclosure is shown in FIG. 11. As discussed above, a support and carrier assembly in accordance with the subject matter of the present disclosure can function to support and/or maintain an end member of a gas spring assembly (e.g., end member 240) in a longitudinal position (in at least one direction) on or along a damper housing of a damper assembly (e.g., damper housing 206) to at least partially form a gas spring and damper assembly. Additionally, or in the alternative, a support and carrier assembly in accordance with the subject matter of the present disclosure can function to at least partially form a substantially fluid-tight seal between such an end member and such a damper housing to at least partially form a gas spring and damper assembly in accordance with the subject matter of the present disclosure. In a preferred arrangement, a support and carrier assembly in accordance with the subject matter of the present disclosure can be operatively connected between such an end member and such a damper housing to both support and maintain the end member on the damper housing and to at least partially form a substantially fluid-tight seal therebetween.

It will be appreciated that support and carrier assembly 500 can be formed from any suitable material or combination of materials. Additionally, it will be appreciated that support and carrier assembly 500 can include any suitable number or combination of one or more components and/or elements, and that any such one or more components and/or elements can include any suitable number or combination of walls and/or wall portions. For example, support and carrier assembly 500 can include a support element 502 and a seal carrier element 504 that is operatively supported on or along the support element. Additionally, support and carrier assembly 500 can include a plurality of sealing elements sealingly disposed between a component of the support and carrier assembly (e.g., seal carrier element 504) and another component of the gas spring and damper assembly (e.g., one of end member 240 and damper housing 206). In a preferred arrangement, a sealing element 506 can be sealingly disposed between seal carrier element 504 and damper housing 206, and a sealing element 508 can be sealingly disposed between the seal carrier element and end member 204.

It will be appreciated that support element 502 and seal carrier element 504 can be of any suitable size, shape, configuration and/or construction, and can be formed from any suitable material or combination of materials. As one example, support element 502 can take the form of an endless, annular ring that extends peripherally about axis AX. Support element 502 can include a support element body or wall 510 that can include a first or radial wall portion 512 and a second or axial wall portion 514. In the arrangement shown in FIG. 11, radial wall portion 512 is disposed transverse to axis AX (FIG. 3). Radial wall portion 512 is shown as extending between an inner surface 516 disposed in facing relation to an outer surface of housing wall 214 of damper housing 206 and an outer surface 518. Radial wall portion 512 can also include a first or upper surface 520 and a second or lower surface 522 disposed opposite first surface 520. In the arrangement shown, second surface 522 is disposed in abutting engagement with retaining ring 364 such that support assembly 502 as well as support and carrier assembly 500 can be supported by the retaining ring on or along damper housing 206.

Axial wall portion 514 of support element wall 510 can extend from along radial wall portion 512 in an axial direction toward end 212 of damper housing 206. Axial wall portion 514 can, in some cases, at least partially define outer surface 518 of support element 502, and can extend from along radial wall portion 512 to an end surface 524. Axial wall portion 514 can, in some cases, include an inside surface 526 disposed opposite outer surface 518 and in facing relation to the outer surface of housing wall 214. In such cases, inside surface 526 can extend axially between second surface 522 and end surface 524 such that support element 502 has a generally L-shaped cross-sectional shape or profile.

As one example, seal carrier element 504 can include a carrier element body or wall 528 that can extend between an inner surface 530 disposed adjacent the outer surface of damper housing 206 and an outer surface 532 disposed radially outward from inner surface 530. Body 528 can extend axially between end surfaces 534 and 536 with end surface 534 facing away from support element 502 and end surface 536 facing toward the support element. In some cases, support element 502 and seal carrier element 504 can be provided separately from one another and can remain as individual components in an installed condition on or along gas spring and damper assembly 200. In other cases, support element 502 and seal carrier element 504 can be secured or otherwise attached to one another in a suitable manner, such as by way of a flowed-material joint, such as is represented in FIG. 11 by dashed line 538, for example.

Carrier element body 528 is shown as including an outer wall portion 540 extending radially from a lower portion 532A of outer surface 532 inwardly toward inner surface 530. Outer wall portion 540 is also shown as extending axially between end surface 536 and a shoulder surface 542. Additionally, a tapered or frustoconical surface or wall portion 544 can extend between and operatively connect outer surface 532 and shoulder surface 542. In a preferred arrangement, seal carrier element 504 can be captured between the end member (e.g., end member 240) and/or a component thereof (e.g., end member core 316) and support element 502, such as, for example, as has been described hereinafter.

As discussed above, support and carrier assembly 500 can, in some cases, also function as a carrier for one or more sealing elements. In the arrangement shown in FIG. 11, for example, sealing element 506 is sealingly disposed between the outer surface of housing wall 214 and body 528. Additionally, sealing element 508 is sealingly disposed between inner surface 358 of end member core 316 and body 528. It will be appreciated that the one or more sealing elements (e.g., sealing elements 506 and/or 508) can be supported in sealing engagement with carrier element body 528 of seal carrier element 504 in any suitable manner. As shown in FIG. 11, for example, carrier element body 528 can include an endless, annular groove 546 extending radially outward into the body from along inner surface 530 that is dimensioned to receive and retain sealing element 506. As another example, body 528 can include an endless, annular groove 548 extending radially inward into the body from along outer surface 532 that is dimensioned to receive and retain sealing element 508. It will be appreciated, however, that other configurations and/or arrangements could alternately be used.

As indicated above, it will be appreciated that support and carrier assembly 500 and the components thereof can be formed from any suitable material or combination of materials. As one example, support element body 510 can be at least partially formed from a metal material (e.g., steel or aluminum) and/or a substantially-rigid polymeric material (e.g., a high-strength thermoplastic). As another example, carrier element body 528 can be at least partially formed from a metal material (e.g., steel or aluminum) and/or a substantially-rigid polymeric material (e.g., a high-strength thermoplastic). Additionally, sealing elements 506 and 508 can be at least partially formed from an elastomeric material (e.g., natural rubber, synthetic rubber and/or thermoplastic elastomer).

Figure 12:
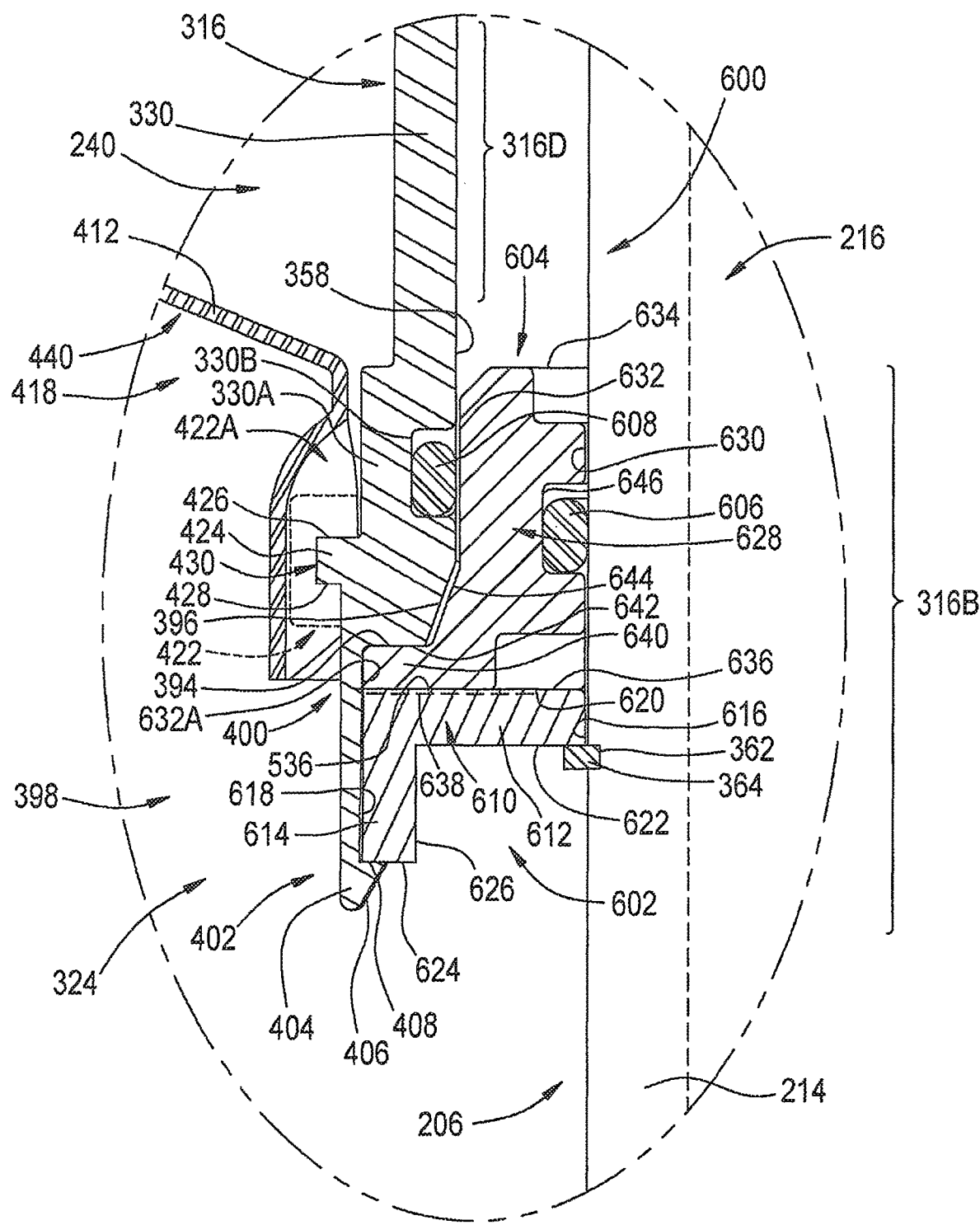
FIG. 12 is an enlarged cross-sectional view of another alternate embodiment of the portion of the gas spring and damper assembly identified in Detail 4 of FIG. 3.

Yet another example of a support and carrier assembly 600 in accordance with the subject matter of the present disclosure is shown in FIG. 12. As discussed above, a support and carrier assembly in accordance with the subject matter of the present disclosure can function to support and/or maintain an end member of a gas spring assembly (e.g., end member 240) in a longitudinal position (in at least one direction) on or along a damper housing of a damper assembly (e.g., damper housing 206) to at least partially form a gas spring and damper assembly. Additionally, or in the alternative, a support and carrier assembly in accordance with the subject matter of the present disclosure can function to at least partially form a substantially fluid-tight seal between such an end member and such a damper housing to at least partially form a gas spring and damper assembly in accordance with the subject matter of the present disclosure. In a preferred arrangement, a support and carrier assembly in accordance with the subject matter of the present disclosure can be operatively connected between such an end member and such a damper housing to both support and maintain the end member on the damper housing and to at least partially form a substantially fluid-tight seal therebetween.

It will be appreciated that support and carrier assembly 600 can be formed from any suitable material or combination of materials. Additionally, it will be appreciated that support and carrier assembly 600 can include any suitable number or combination of one or more components and/or elements, and that any such one or more components and/or elements can include any suitable number or combination of walls and/or wall portions. For example, support and carrier assembly 600 can include a support element 602 and a seal carrier element 604 that is operatively supported on or along the support element. Additionally, support and carrier assembly 600 can include a plurality of sealing elements sealingly disposed between a component of the support and carrier assembly (e.g., seal carrier element 604) and another component of the gas spring and damper assembly (e.g., one of end member 240 and damper housing 206). In a preferred arrangement, a sealing element 606 can be sealingly disposed between seal carrier element 604 and damper housing 206, and a sealing element 608 can be sealingly disposed between the seal carrier element and end member 204.

It will be appreciated that support element 602 and seal carrier element 604 can be of any suitable size, shape, configuration and/or construction, and can be formed from any suitable material or combination of materials. As one example, support element 602 can take the form of an endless, annular ring that extends peripherally about axis AX. Support element 602 can include a support element body or wall 610 that can include a first or radial wall portion 612 and a second or axial wall portion 614. In the arrangement shown in FIG. 12, radial wall portion 612 is disposed transverse to axis AX (FIG. 3). Radial wall portion 612 is shown as extending between an inner surface 616 disposed in facing relation to an outer surface of housing wall 214 of damper housing 206 and an outer surface 618. Radial wall portion 612 can also include a first or upper surface 620 and a second or lower surface 622 disposed opposite first surface 620. In the arrangement shown, second surface 622 is disposed in abutting engagement with retaining ring 364 such that support assembly 602 as well as support and carrier assembly 600 can be supported by the retaining ring on or along damper housing 206.

Axial wall portion 614 of support element wall 610 can extend from along radial wall portion 612 in an axial direction toward end 212 of damper housing 206. Axial wall portion 614 can, in some cases, at least partially define outer surface 618 of support element 602, and can extend from along radial wall portion 612 to an end surface 624. Axial wall portion 614 can, in some cases, include an inside surface 626 disposed opposite outer surface 618 and in facing relation to the outer surface of housing wall 214. In such cases, inside surface 626 can extend axially between second surface 622 and end surface 624 such that support element 602 has a generally L-shaped cross-sectional shape or profile.

As one example, seal carrier element 604 can include a carrier element body or wall 628 that can extend between an inner surface 630 disposed adjacent the outer surface of damper housing 206 and an outer surface 632 disposed radially outward from inner surface 630. Body 628 can extend axially between end surfaces 634 and 636 with end surface 634 facing away from support element 602 and end surface 636 facing toward the support element. In some cases, support element 602 and seal carrier element 604 can be provided separately from one another and can remain as individual components in an installed condition on or along gas spring and damper assembly 200. In other cases, support element 602 and seal carrier element 604 can be secured or otherwise attached to one another in a suitable manner, such as by way of a flowed-material joint, such as is represented in FIG. 12 by dashed line 638, for example.

Carrier element body 628 is shown as including an outer wall portion 640 extending radially from a lower portion 632A of outer surface 632 inwardly toward inner surface 630. Outer wall portion 640 is also shown as extending axially between end surface 636 and a shoulder surface 642. Additionally, a tapered or frustoconical surface or wall portion 644 can extend between and operatively connect outer surface 632 and shoulder surface 642. In a preferred arrangement, seal carrier element 604 can be captured between the end member (e.g., end member 240) and/or a component thereof (e.g., end member core 316) and support element 602, such as, for example, as has been described hereinafter.

As discussed above, support and carrier assembly 600 can, in some cases, also function as a carrier for one or more sealing elements. In the arrangement shown in FIG. 12, for example, sealing element 606 is sealingly disposed between the outer surface of housing wall 214 and body 628. Additionally, sealing element 608 is sealingly disposed between end member core 316 and body 628. It will be appreciated that the one or more sealing elements (e.g., sealing elements 606 and/or 608) can be supported in sealing engagement with carrier element body 628 of seal carrier element 604 in any suitable manner. As shown in FIG. 12, for example, carrier element body 628 can include an endless, annular groove 646 extending radially outward into the body from along inner surface 630 that is dimensioned to receive and retain sealing element 606. As another example, core wall 330 of end member core 316 can include a wall portion 330A that includes an endless, annular groove 330B extending radially inward into core wall from along inner surface 358 that is dimensioned to receive and retain sealing element 608. It will be appreciated, however, that other configurations and/or arrangements could alternately be used.

As indicated above, it will be appreciated that support and carrier assembly 600 and the components thereof can be formed from any suitable material or combination of materials. As one example, support element body 610 can be at least partially formed from a metal material (e.g., steel or aluminum) and/or a substantially-rigid polymeric material (e.g., a high-strength thermoplastic). As another example, carrier element body 628 can be at least partially formed from a metal material (e.g., steel or aluminum) and/or a substantially-rigid polymeric material (e.g., a high-strength thermoplastic). Additionally, sealing elements 606 and 608 can be at least partially formed from an elastomeric material (e.g., natural rubber, synthetic rubber and/or thermoplastic elastomer).

Figure 13:
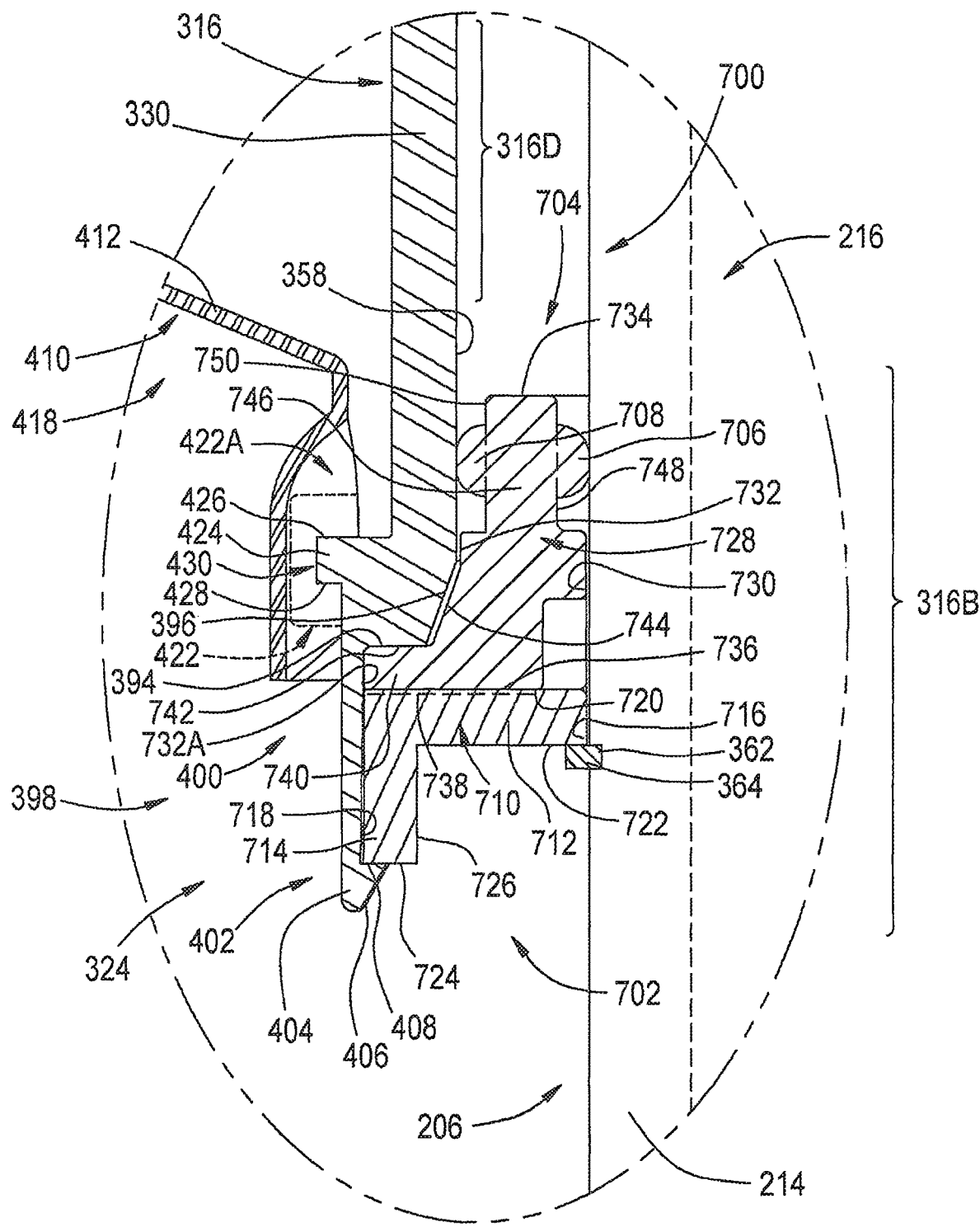
FIG. 13 is an enlarged cross-sectional view of a further alternate embodiment of the portion of the gas spring and damper assembly identified in Detail 4 of FIG. 3.

A further example of a support and carrier assembly 700 in accordance with the subject matter of the present disclosure is shown in FIG. 13. As discussed above, a support and carrier assembly in accordance with the subject matter of the present disclosure can function to support and/or maintain an end member of a gas spring assembly (e.g., end member 240) in a longitudinal position (in at least one direction) on or along a damper housing of a damper assembly (e.g., damper housing 206) to at least partially form a gas spring and damper assembly. Additionally, or in the alternative, a support and carrier assembly in accordance with the subject matter of the present disclosure can function to at least partially form a substantially fluid-tight seal between such an end member and such a damper housing to at least partially form a gas spring and damper assembly in accordance with the subject matter of the present disclosure. In a preferred arrangement, a support and carrier assembly in accordance with the subject matter of the present disclosure can be operatively connected between such an end member and such a damper housing to both support and maintain the end member on the damper housing and to at least partially form a substantially fluid-tight seal therebetween.

It will be appreciated that support and carrier assembly 700 can be formed from any suitable material or combination of materials. Additionally, it will be appreciated that support and carrier assembly 700 can include any suitable number or combination of one or more components and/or elements, and that any such one or more components and/or elements can include any suitable number or combination of walls and/or wall portions. For example, support and carrier assembly 700 can include a support element 702 and a seal carrier element 704 that is operatively supported on or along the support element. Additionally, support and carrier assembly 700 can include a plurality of sealing elements sealingly disposed between a component of the support and carrier assembly (e.g., seal carrier element 704) and another component of the gas spring and damper assembly (e.g., one of end member 240 and damper housing 206). In a preferred arrangement, a sealing element 706 can be sealingly disposed between seal carrier element 704 and damper housing 206, and a sealing element 708 can be sealingly disposed between the seal carrier element and end member 204.

It will be appreciated that support element 702 and seal carrier element 704 can be of any suitable size, shape, configuration and/or construction, and can be formed from any suitable material or combination of materials. As one example, support element 702 can take the form of an endless, annular ring that extends peripherally about axis AX. Support element 702 can include a support element body or wall 710 that can include a first or radial wall portion 712 and a second or axial wall portion 714. In the arrangement shown in FIG. 13, radial wall portion 712 is disposed transverse to axis AX (FIG. 3). Radial wall portion 712 is shown as extending between an inner surface 716 disposed in facing relation to an outer surface of housing wall 214 of damper housing 206 and an outer surface 718. Radial wall portion 712 can also include a first or upper surface 720 and a second or lower surface 722 disposed opposite first surface 720. In the arrangement shown, second surface 722 is disposed in abutting engagement with retaining ring 364 such that support assembly 702 as well as support and carrier assembly 700 can be supported by the retaining ring on or along damper housing 206.

Axial wall portion 714 of support element wall 710 can extend from along radial wall portion 712 in an axial direction toward end 212 of damper housing 206. Axial wall portion 714 can, in some cases, at least partially define outer surface 718 of support element 702, and can extend from along radial wall portion 712 to an end surface 724. Axial wall portion 714 can, in some cases, include an inside surface 726 disposed opposite outer surface 718 and in facing relation to the outer surface of housing wall 214. In such cases, inside surface 726 can extend axially between second surface 722 and end surface 724 such that support element 702 has a generally L-shaped cross-sectional shape or profile.

As one example, seal carrier element 704 can include a carrier element body or wall 728 that can extend between an inner surface 730 disposed adjacent the outer surface of damper housing 206 and an outer surface 732 disposed radially outward from inner surface 730. Body 728 can extend axially between end surfaces 734 and 736 with end surface 734 facing away from support element 702 and end surface 736 facing toward the support element. In some cases, support element 702 and seal carrier element 704 can be provided separately from one another and can remain as individual components in an installed condition on or along gas spring and damper assembly 200. In other cases, support element 702 and seal carrier element 704 can be secured or otherwise attached to one another in a suitable manner, such as by way of a flowed-material joint, such as is represented in FIG. 13 by dashed line 738, for example.

Carrier element body 728 is shown as including an outer wall portion 740 extending radially from a lower portion 732A of outer surface 732 inwardly toward inner surface 730. Outer wall portion 740 is also shown as extending axially between end surface 736 and a shoulder surface 742. Additionally, a tapered or frustoconical surface or wall portion 744 can extend between and operatively connect outer surface 732 and shoulder surface 742. In a preferred arrangement, seal carrier element 704 can be captured between the end member (e.g., end member 240) and/or a component thereof (e.g., end member core 316) and support element 702, such as, for example, as has been described hereinafter.

Carrier element body 728 is also shown as including support wall portion 746 extending in a generally axial direction from along outer wall portion 740 to end surface 734. Support wall portion can include an inner support surface 748 facing toward the outer surface of housing wall 214 and an outer support surface 750 facing outwardly toward inner surface 358 of core wall 330. As discussed above, support and carrier assembly 700 can, in some cases, also function as a carrier for one or more sealing elements. In the arrangement shown in FIG. 13, for example, sealing elements 706 and 708 integrally formed along support wall portion 746 with sealing element 706 projecting radially inward from along inner support surface 748 and sealing element 708 projecting radially outward form along outer support surface 750. As such, sealing element 706 is disposed in sealing engagement with the outer surface of housing wall 214 and body 728. Additionally, sealing element 708 is disposed in sealing engagement with inner surface 358 of end member core 316.

As indicated above, it will be appreciated that support and carrier assembly 700 and the components thereof can be formed from any suitable material or combination of materials. As one example, support element body 710 can be at least partially formed from a metal material (e.g., steel or aluminum) and/or a substantially-rigid polymeric material (e.g., a high-strength thermoplastic). As another example, carrier element body 728 and sealing elements 706 and 708 can be at least partially formed from an elastomeric material (e.g., natural rubber, synthetic rubber and/or thermoplastic elastomer).

Figure 14:
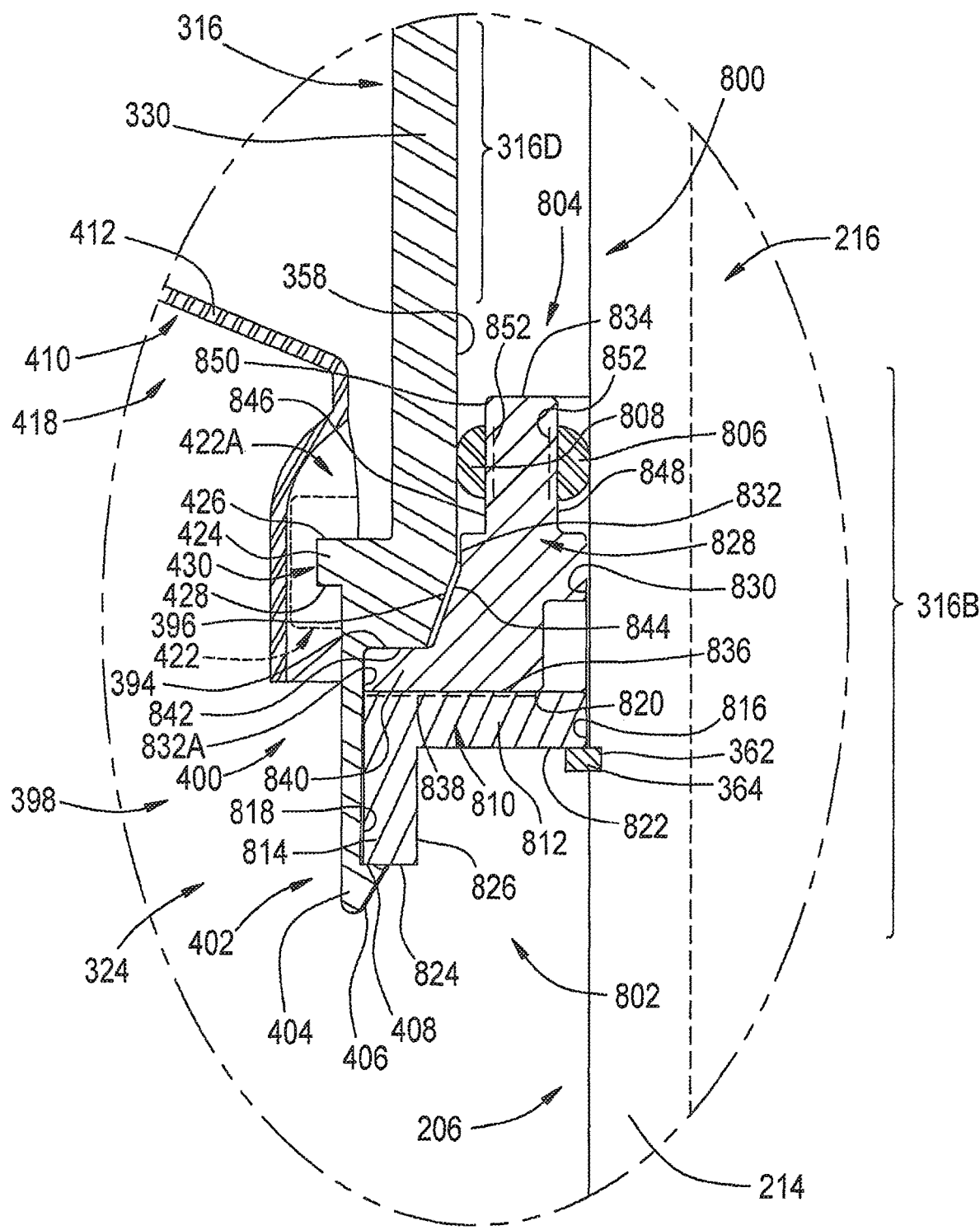
FIG. 14 is an enlarged cross-sectional view of still a further alternate embodiment of the portion of the gas spring and damper assembly identified in Detail 4 of FIG. 3.

Still a further example of a support and carrier assembly 800 in accordance with the subject matter of the present disclosure is shown in FIG. 14. As discussed above, a support and carrier assembly in accordance with the subject matter of the present disclosure can function to support and/or maintain an end member of a gas spring assembly (e.g., end member 240) in a longitudinal position (in at least one direction) on or along a damper housing of a damper assembly (e.g., damper housing 206) to at least partially form a gas spring and damper assembly. Additionally, or in the alternative, a support and carrier assembly in accordance with the subject matter of the present disclosure can function to at least partially form a substantially fluid-tight seal between such an end member and such a damper housing to at least partially form a gas spring and damper assembly in accordance with the subject matter of the present disclosure. In a preferred arrangement, a support and carrier assembly in accordance with the subject matter of the present disclosure can be operatively connected between such an end member and such a damper housing to both support and maintain the end member on the damper housing and to at least partially form a substantially fluid-tight seal therebetween.

It will be appreciated that support and carrier assembly 800 can be formed from any suitable material or combination of materials. Additionally, it will be appreciated that support and carrier assembly 800 can include any suitable number or combination of one or more components and/or elements, and that any such one or more components and/or elements can include any suitable number or combination of walls and/or wall portions. For example, support and carrier assembly 800 can include a support element 802 and a seal carrier element 804 that is operatively supported on or along the support element. Additionally, support and carrier assembly 800 can include a plurality of sealing elements sealingly disposed between a component of the support and carrier assembly (e.g., seal carrier element 804) and another component of the gas spring and damper assembly (e.g., one of end member 240 and damper housing 206). In a preferred arrangement, a sealing element 806 can be sealingly disposed between seal carrier element 804 and damper housing 206, and a sealing element 808 can be sealingly disposed between the seal carrier element and end member 204.

It will be appreciated that support element 802 and seal carrier element 804 can be of any suitable size, shape, configuration and/or construction, and can be formed from any suitable material or combination of materials. As one example, support element 802 can take the form of an endless, annular ring that extends peripherally about axis AX. Support element 802 can include a support element body or wall 810 that can include a first or radial wall portion 812 and a second or axial wall portion 814. In the arrangement shown in FIG. 14, radial wall portion 812 is disposed transverse to axis AX (FIG. 3). Radial wall portion 812 is shown as extending between an inner surface 816 disposed in facing relation to an outer surface of housing wall 214 of damper housing 206 and an outer surface 818. Radial wall portion 812 can also include a first or upper surface 820 and a second or lower surface 822 disposed opposite first surface 820. In the arrangement shown, second surface 822 is disposed in abutting engagement with retaining ring 364 such that support assembly 802 as well as support and carrier assembly 800 can be supported by the retaining ring on or along damper housing 206.

Axial wall portion 814 of support element wall 810 can extend from along radial wall portion 812 in an axial direction toward end 212 of damper housing 206. Axial wall portion 814 can, in some cases, at least partially define outer surface 818 of support element 802, and can extend from along radial wall portion 812 to an end surface 824. Axial wall portion 814 can, in some cases, include an inside surface 826 disposed opposite outer surface 818 and in facing relation to the outer surface of housing wall 214. In such cases, inside surface 826 can extend axially between second surface 822 and end surface 824 such that support element 802 has a generally L-shaped cross-sectional shape or profile.

As one example, seal carrier element 804 can include a carrier element body or wall 828 that can extend between an inner surface 830 disposed adjacent the outer surface of damper housing 206 and an outer surface 832 disposed radially outward from inner surface 830. Body 828 can extend axially between end surfaces 834 and 836 with end surface 834 facing away from support element 802 and end surface 836 facing toward the support element. In some cases, support element 802 and seal carrier element 804 can be provided separately from one another and can remain as individual components in an installed condition on or along gas spring and damper assembly 200. In other cases, support element 802 and seal carrier element 804 can be secured or otherwise attached to one another in a suitable manner, such as by way of a flowed-material joint, such as is represented in FIG. 14 by dashed line 838, for example.

Carrier element body 828 is shown as including an outer wall portion 840 extending radially from a lower portion 832A of outer surface 832 inwardly toward inner surface 830. Outer wall portion 840 is also shown as extending axially between end surface 836 and a shoulder surface 842. Additionally, a tapered or frustoconical surface or wall portion 844 can extend between and operatively connect outer surface 832 and shoulder surface 842. In a preferred arrangement, seal carrier element 804 can be captured between the end member (e.g., end member 240) and/or a component thereof (e.g., end member core 316) and support element 802, such as, for example, as has been described hereinafter.

Carrier element body 828 is also shown as including support wall portion 846 extending in a generally axial direction from along outer wall portion 840 to end surface 834. Support wall portion can include an inner support surface 848 facing toward the outer surface of housing wall 214 and an outer support surface 850 facing outwardly toward inner surface 358 of core wall 330. As discussed above, support and carrier assembly 800 can, in some cases, also function as a carrier for one or more sealing elements. It will be appreciated that the one or more sealing elements (e.g., sealing elements 806 and/or 808) can be supported in sealing engagement with carrier element body 828 of seal carrier element 804 in any suitable manner. As shown in FIG. 14, for example, sealing elements 806 and 808 are attached along support wall portion 846 with sealing element 806 projecting radially inward from along inner support surface 848 and sealing element 808 projecting radially outward form along outer support surface 850. As such, sealing element 806 is disposed in sealing engagement with the outer surface of housing wall 214 and body 828. Additionally, sealing element 808 is disposed in sealing engagement with inner surface 358 of end member core 316. It will be appreciated that sealing elements 806 and 808 can be respectively secured on or along inner and outer support surfaces 848 and 850 in any suitable manner. As one example, sealing elements can be secured on support wall portion 846 of carrier element body 828 by way of flowed-material joints, such as are represented in FIG. 14 by dashed lines 852, for example.

As indicated above, it will be appreciated that support and carrier assembly 800 and the components thereof can be formed from any suitable material or combination of materials. As one example, support element body 810 can be at least partially formed from a metal material (e.g., steel or aluminum) and/or a substantially-rigid polymeric material (e.g., a high-strength thermoplastic). As another example, carrier element body 828 can be at least partially formed from a metal material (e.g., steel or aluminum) and/or a substantially-rigid polymeric material (e.g., a high-strength thermoplastic). Additionally, sealing elements 806 and 808 can be at least partially formed from an elastomeric material (e.g., natural rubber, synthetic rubber and/or thermoplastic elastomer).

With further reference, now, to FIGS. 3-10, core wall 330 of end member core 316 can include an end surface or wall portion 394 disposed along end 324 that can be dimensioned to abuttingly engage a support and carrier assembly in accordance with the subject matter of the present disclosure (e.g., one of assemblies 366, 500, 600, 700 and/or 800) in a manner suitable for at least partially supporting end member core 316 in a longitudinal direction on the damper housing. In the arrangement shown in FIGS. 3 and 4, for example, end surface 394 can be disposed in abutting engagement with shoulder surface 380 of body 368 (or, alternately, any one of shoulder surfaces 542, 642, 742 and 842). In this manner, end surface 394 can function to at least partially support end member core 316 in the longitudinal direction on or along damper housing 206. Additionally, core wall 330 can include a tapered or frustoconical surface or wall portion 396 disposed along end 324. In a preferred arrangement, tapered surface 396 can transition inner surface 358 of core wall 330 to end wall portion 394, and, in some cases, can act as a pilot or radial support feature for end 324 of end member core 316 on or along the support and carrier assembly.

In some cases, an end member (or end member assembly) in accordance with the subject matter of the present disclosure can be removably secured on or along the associated damper assembly. It will be appreciated that such a removable attachment can be provided by way of any suitable configuration, construction and/or arrangement. As one example, end member core 316 can include one or more resilient retaining members dimensioned to engage an associated support element disposed on or along the damper housing. In the arrangement shown in FIGS. 2-10, for example, core wall 330 includes a plurality of retaining members 398 that are disposed in peripherally-spaced relation to one another about axis AX. In one exemplary arrangement, the retaining members are substantially evenly spaced around the circumference or periphery of the end member core. However, it will be appreciated that any suitable arrangement and/or configuration of retaining members can alternately be used.

Retaining members 398 include a first or attached end 400 extending from core wall 330, and a second or free end 402 opposite the attached end. Additionally, a projection 404 can extend radially inward along the free end of the retaining members. Projections 404 can include a frustoconical or otherwise tapered surface 406 and a shoulder surface 408 suitable for engaging an end surface or shoulder wall portion of a support and carrier assembly in accordance with the subject matter of the present disclosure, such as support element 366, for example. Preferably, retaining members 398 are resiliently deflectable such that free ends 402 can be radially-outwardly displaced as surfaces 406 engage the support element during assembly of end member core 316 on or along damper housing 206. Once the end member or component thereof has been sufficiently displaced over the support element, projections 404 of retaining members 398 are displaced beyond the end surface or shoulder wall portion of the support element, and resiliently recover or otherwise return to a radially-inwardly biased position in which shoulders surface 408 engage the end surface or shoulder wall portion of the support element (e.g., support element 366) and thereby removably secure end member 240 on or along damper housing 206.

Gas spring and damper assembly 200 can, optionally, include an extensible cover or boot 410 that can include a cover wall 412 with a plurality of convolutions or pleats 414 that permit the cover to extend and contract as the gas spring and damper assembly is displaced between extended and collapsed conditions. Cover wall 412 can extend between opposing ends 416 and 418. End 416 can be secured on or along one of damping rod 222, end member 238 and restraining cylinder 280 in any suitable manner, such as by way of a retaining ring 420, for example, that can be crimped or otherwise deformed to secure end 416 on or along the associated component. Cover 410 can also, optionally, include a plurality of retaining members 422 disposed along end 418 of cover wall 412. In a preferred arrangement, retaining members 422 are dimensioned to removably secure end 418 of cover 410 on or along an associated component, such as one of damper housing 206, end member core 316, end member shell 318 and support element 366. In some cases, retaining members 422 can be disposed in spaced relation to one another along end 416 and around axis AX. In such cases, cover 410 can also include vents 422A disposed between adjacent ones of retaining members 422 and operative to permit the passage of air into and out of cover 410 as well as to all moisture, debris and other foreign materials to be discharged from within cover 410.

In the arrangement shown in FIGS. 2-10, core wall 330 can include a projection wall portion 424 that can extend peripherally about axis AX. Projection wall portion 424 is shown as including opposing end surfaces 426 and 428. Cover 410 can include a slot or groove 430 extending into retaining members 422. In a preferred arrangement, slots 430 are dimensioned to form a friction fit over end surfaces 426 and 428 such that retaining members 422 can removably engage projection wall portion 424 and thereby secure end 418 of cover wall 412 on or along end member core 316.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood that claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring and damper assembly comprising:
   a damper assembly having a longitudinally-extending axis and including a damper housing and a damper rod assembly operatively interengaged with said damper housing for reciprocal displacement relative thereto; and,
   a gas spring assembly operatively connected with said damper assembly, said gas spring assembly including:

a first end member operatively connected to said damper rod assembly in substantially fixed axial relation thereto;

a second end member supported along said damper housing, said second end member including an end member wall with an end surface portion oriented transverse to said longitudinal axis; and, a flexible spring member secured between said first and second end members in a substantially fluid-tight manner such that a spring chamber is at least partially defined by said flexible spring member between said first and second end member; and, a support and carrier assembly supported along said damper housing, said support and carrier assembly including:

a retaining ring secured in a substantially-fixed axial position along said damper housing;

a support element including a support element wall with an inner surface portion facing radially inward toward said damper housing, an outer surface portion facing radially outward, a first end surface portion and a second end surface portion facing opposite said first end surface portion, said support element supported along said damper housing on said retaining ring such that said retaining ring substantially inhibits displacement of said support element in at least one axial direction;

a seal carrier including a seal carrier wall with an inner surface portion facing said damper housing, a first outer surface portion positioned radially outward of said inner surface portion a first distance, a second outer surface portion positioned radially outward of said inner surface portion a second distance that is greater than said first distance such that a shoulder surface portion extends radially between said first and second outer surface portions, and a first end surface portion facing opposite said shoulder surface portion;

a first sealing element disposed along said inner surface portion of said seal carrier; and, a second sealing element disposed along one of said first and second outer surface portions of said seal carrier;

said support and carrier assembly operatively supporting said second end member on said damper housing with said shoulder surface portion of said seal carrier facing said end surface portion of said end member wall and said first end surface portion of said seal carrier facing said first end surface portion of said support element such that a radial wall portion of said seal carrier wall is captured between said second end member and said support element with said seal carrier, said first sealing element and said second sealing element together forming said substantially fluid-tight connection between said second end member and said damper housing.

2. A gas spring and damper assembly according claim 1, wherein said end member wall of said second end member includes a side wall portion spaced radially outward of said damper housing such that a gap is formed radially therebetween, said seal carrier wall including an axial wall portion extending axially beyond said shoulder surface portion in a direction opposite said first end surface portion of said seal carrier to a second end surface portion with said axial wall portion disposed within said gap between said side wall portion of said second end member and said damper housing.

3. A gas spring and damper assembly according to claim 1, wherein said seal carrier includes an annular groove disposed in facing relation to said damper housing with said first sealing element partially received within said annular groove.

4. A gas spring and damper assembly according to claim 1, wherein said seal carrier includes an annular groove disposed in facing relation to said second end member with said second sealing element partially received within said annular groove.

5. A gas spring and damper assembly according to claim 1, wherein said second end member includes an annular groove disposed in facing relation to said seal carrier with said second sealing element partially received within said annular groove.

6. A gas spring and damper assembly according to claim 1, wherein said inner surface portion of said seal carrier is disposed in radially-spaced relation to said damper housing and said first outer surface portion of said seal carrier is disposed in radially-spaced relation to said second end member, and said first sealing element is disposed along said inner surface portion in sealing engagement with said damper housing and said second sealing element is disposed along said first outer surface portion in sealing engagement with said second end member.

7. A gas spring and damper assembly according to claim 6, wherein said seal carrier and said at least one of said first sealing element and said second sealing element are integrally formed with one another from a common material.

8. A gas spring and damper assembly according to claim 6, wherein said seal carrier is at least partially formed from a first material and said at least one of said first sealing element and said second sealing element are at least partially formed from a second material that is different from said first material.

9. A gas spring and damper assembly according to claim 1, wherein at least one of said first sealing element and said second sealing element is attached to said seal carrier by way of a flowed-material joint.

10. A gas spring and damper assembly according to claim 1, wherein said seal assembly is attached to said first surface of said support element by way of a flowed material joint.

11. A gas spring and damper assembly according to claim 1, wherein said support element wall of said support element includes a radial wall portion extending from said inner surface portion toward said outer surface portion and an axial wall portion extending from said radial wall portion in an axial direction away from said first end surface portion beyond said second end surface portion to a third end surface portion.

12. A gas spring and damper assembly according to claim 1, wherein said second end member includes a plurality of retaining members projecting axially therefrom, said plurality of retaining members including a first end attached to said second end member and a second end disposed in spaced relation to said second end member such that said plurality of retaining members are capable of undergoing resilient deflection to engage said support element.

13. An end member assembly dimensioned for securement along an associated damper assembly and for securement to an associated flexible spring member, said end member assembly comprising:

an end member core having a longitudinal axis, said end member core including a core wall extending peripherally about said longitudinal axis and longitudinally between opposing first and second ends, said core wall including:

an inner surface at least partially defining a longitudinal passage extending through said end member core and dimensioned to receive the associated damper assembly;
a first section disposed along said first end of said end member core, said first section dimensioned to receive an associated end of the associated flexible spring member; and,
a second section disposed along said second end of said end member core in spaced relation to said first section and including an opening formed along said second end through which the associated damper assembly can extend, said core wall including an end surface portion disposed along said second section and oriented transverse to said longitudinal axis;
a support element including a support element wall with an inner surface portion facing radially inward toward said damper housing, an outer surface portion facing radially outward, a first end surface portion and a second end surface portion facing opposite said first end surface portion, said support element supported along said damper housing on said retaining ring such that said retaining ring substantially inhibits displacement of said support element in at least one axial direction;
a seal carrier axially positioned within said opening of said second section, said seal carrier including a seal carrier wall with an inner surface portion facing radially inward, a first outer surface portion positioned radially outward of said inner surface portion a first distance, a second outer surface portion positioned radially outward of said inner surface portion a second distance that is greater than said first distance such that a shoulder surface portion extends radially between said first and second outer surface portions, and a first end surface portion facing opposite said shoulder surface portion and abuttingly engaging said first end surface portion of said support element;
a first sealing element axially positioned within said opening of said second section and disposed along said inner surface portion of said seal carrier such that at least a portion of said first sealing element is radially-inwardly exposed; and,
a second sealing element axially positioned within said opening of said second section and sealingly disposed along one of said first and second outer surface portions of said seal carrier between said seal carrier and said core wall of said end member core.

14. An end member assembly according to claim 13, wherein said core wall includes an intermediate section disposed between said first and second sections and including an outer surface portion, and said end member assembly further comprising an end member shell secured along said intermediate section.

15. A gas spring and damper assembly according to claim 13 wherein said seal carrier includes an annular groove disposed along said first side with said first sealing element partially received within said annular groove.

16. A gas spring and damper assembly according to claim 13, wherein said seal carrier includes an annular groove disposed along said second side with said second sealing element partially received within said annular groove.

17. A gas spring and damper assembly comprising:
a damper assembly having a longitudinally-extending axis and including a damper housing with an outer surface portion and a damper rod assembly operatively interengaged with said damper housing for reciprocal displacement relative thereto; and,
a gas spring assembly operatively connected with said damper assembly, said gas spring assembly including:
a first end member operatively connected to said damper rod assembly in substantially fixed axial relation thereto;
a second end member including an end member wall with a side wall portion extending axially toward an end surface portion oriented transverse to said longitudinal axis, said second end member positioned along said damper housing such that a radial gap is formed between said side wall portion of said second end member and said outer surface portion of said damper housing; and,
a flexible spring member secured between said first and second end members in a substantially fluid-tight manner such that a spring chamber is at least partially defined by said flexible spring member between said first and second end member; and,
a support and carrier assembly supported along said damper housing, said support and carrier assembly including:
a retaining ring secured in a substantially-fixed axial position along said damper housing;
a support element including a support element wall with an inner surface facing radially inward toward said damper housing, an outer surface facing radially outward, a first end surface and a second end surface facing opposite said first end surface, said support element supported along said damper housing on said retaining ring such that said retaining ring substantially inhibits displacement of said support element in at least one axial direction;
a seal carrier including a seal carrier wall with an axial wall portion and a radial wall portion extending radially outward beyond said axial wall portion;
a first sealing element; and,
a second sealing element;
said support and carrier assembly operatively supporting said second end member on said damper housing with said radial wall portion of said seal carrier wall disposed between said end surface portion of said second end member and said first end surface of said support ring and said axial wall portion of said seal carrier wall extending axially into said gap between said side wall portion of said second end member and said outer surface portion of said damper housing, said first sealing element sealingly disposed between said seal carrier and said outer surface portion of said damper housing and said second sealing element sealingly disposed between said seal carrier and said side wall portion of said second end member such that said seal carrier, said first sealing element and said second sealing element together forming said substantially fluid-tight connection between said second end member and said damper housing.

18. A gas spring and damper assembly according to claim 17, wherein said second end member includes a plurality of retaining members projecting axially from said side wall portion of said end member wall, said plurality of retaining members including a first end attached to said second end member and a second end disposed in spaced relation to said second end member such that said plurality of retaining members are capable of undergoing resilient deflection to engage said support element.

19. A gas spring and damper assembly according to claim 18, wherein said support element wall of said support element includes a radial wall portion extending from said inner surface portion toward said outer surface portion and an axial wall portion extending from said radial wall portion in an axial direction away from said first end surface portion beyond said second end surface portion to a third end surface portion.

20. A gas spring and damper assembly according to claim 19, wherein said second end of said plurality of retaining members abuttingly engages said third end surface portion of said support element capturing said radial wall portion of said seal carrier between said second end member and said support element.

\* \* \* \* \*